US007483154B2

(12) United States Patent
Nakata et al.

(10) Patent No.: US 7,483,154 B2

(45) Date of Patent: Jan. 27, 2009

(54) POSITION DETECTING DEVICE, LIQUID EJECTING APPARATUS AND METHOD OF CLEANING SMEAR OF SCALE

(75) Inventors: Satoshi Nakata, Tokyo (JP); Hitoshi Igarashi, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 290 days.

(21) Appl. No.: 11/543,689

(22) Filed: Oct. 4, 2006

(65) Prior Publication Data

US 2007/0076225 A1 Apr. 5, 2007

(30) Foreign Application Priority Data

Oct. 4, 2005 (JP) ............................ 2005-290803
Dec. 14, 2005 (JP) ............................ 2005-359991

(51) Int. Cl.
*G01B 11/14* (2006.01)

(52) U.S. Cl. ...................................................... 356/616

(58) Field of Classification Search ................. 356/614, 356/616, 617
See application file for complete search history.

(56) References Cited

U.S. PATENT DOCUMENTS 6,264,303 B1 * 7/2001 Watanabe .................... 347/37

FOREIGN PATENT DOCUMENTS

JP 2002-361901 12/2002

* cited by examiner

*Primary Examiner*—Roy M Punnoose
(74) *Attorney, Agent, or Firm*—John J. Penny, Jr.; Edwards Angell Palmer & Dodge LLP

(57) ABSTRACT

A position detecting device, includes a light emitting portion that includes a light emitting surface which emits light, a light receiving portion that includes a light receiving surface which receives the light from the light emitting portion, a scale that is arranged between the light emitting surface and the light receiving surface, and a cleaning member that is fixed to the scale to clean at least one of the light emitting surface and the light receiving surface.

16 Claims, 17 Drawing Sheets

POSITION DETECTING DEVICE, LIQUID EJECTING APPARATUS AND METHOD OF CLEANING SMEAR OF SCALE

BACKGROUND OF THE INVENTION

The present invention relates to a position detecting device, a liquid ejecting apparatus provided with the same, and a method of cleaning the smear of a scale.

An inkjet printer has been known as a liquid ejecting apparatus for ejecting liquid onto a predetermined medium, such as paper. The inkjet printer includes a paper feed motor that drives a feed roller for feeding printing paper such as a medium, a carriage motor that drives a carriage having a printing head. DC motors are widely used as the above-mentioned motors, for the purpose of reducing noises. The inkjet printer having the DC motor is provided with an encoder, which includes a photosensor and a scale, as a position detecting device used to control the position or the speed of the DC motor. The photosensor includes a light emitting element and a light receiving element, and a light transmitting part for transmitting the light from the light emitting element and a light blocking part for blocking the light from the light emitting element are alternately formed in the scale.

In the inkjet printer, until the ink drops reach a printing surface of the printing paper when ink drops are ejected from the printing head, or when the ink drops reach the printing surface, some ink drops are changed into mist, thereby generating ink mist floating in the air. There has been known that the ink mist is attached to various components in the printer. When the ink mist is attached to the photosensor, the encoder is likely to perform an incorrect detection. Accordingly, a printer having cleaning members for cleaning the ink mist attached to the scale has been proposed to suppress the incorrect detection of the linear encoder (for example, see JP-A-2002-361901 (see FIGS. 5 to 7)).

In a inkjet printer disclosed in JP-A-2002-361901, cleaning members made of urethane resin or the like, which come in contact with both surfaces of a linear scale, are fixed to a photosensor mounted to a carriage. As the carriage reciprocates, the cleaning members slide on both surfaces of the linear scale. As a result, the linear scale is cleaned. Further, in the inkjet printer, the cleaning members made of urethane resin or the like, which come in contact with both surfaces of a linear scale, are fixed to a photosensor mounted to a predetermined bracket. As a rotary scale is rotated, the cleaning members slide on both surfaces of the rotary scale. As a result, the linear scale is cleaned. Moreover, in the inkjet printer disclosed in JP-A-2002-361901, even when the linear scale or the rotary scale detect the position of the carriage or a feed roller, the cleaning members normally slide on the linear scale and the rotary scale.

However, since the cleaning members are fixed to the photosensor in the inkjet printer disclosed in JP-A-2002-361901, even when the position of the carriage or the feed roller is detected, the cleaning members slide on the scales. For this reason, in the inkjet printer that requires a high accuracy in printing, sliding resistance between the cleaning members and the scales is critical. That is, since the sliding resistance between the cleaning members and the scales causes the vibration of the scales and the photosensor or the deterioration in speed of the carriage or the feed roller, there has been a problem in that the accuracy of the encoder deteriorates in detecting the position of the carriage or the feed roller. As a result, there has been a problem in that printing is difficult to be performed with high accuracy.

SUMMARY OF THE INVENTION

An object of the invention is to provide a position detecting device that can suppress the incorrect detection and the deterioration in accuracy in detecting the position of an object to be detected, a liquid ejecting apparatus provided with the same and a method of cleaning the smear of a scale.

In order to achieve the above object, according to the present invention, there is provided a position detecting device for detecting a position of an object, comprising:

a light emitting portion that includes a light emitting surface which emits light;

a light receiving portion that includes a light receiving surface which receives the light from the light emitting portion;

a scale that is arranged between the light emitting surface and the light receiving surface; and a cleaning member that is fixed to the scale to clean at least one of the light emitting surface and the light receiving surface.

According to the above configuration, the smear on the position detecting surface and the smear detecting surface can be removed since the cleaning member is provided. Further, an occurring of erroneous detection at the position detecting device can be suppressed. Also, the cleaning member is fixed to the scale at a position in which the cleaning member constantly comes in contact with the light emitting surface and the light receiving surface when detecting the position of the object. Therefore, a deterioration of the accuracy in a position detection of the object can be suppressed.

Preferably, the scale includes a position detecting pattern for detecting the position of the object. The cleaning member is fixed to the scale in a region which is different from a region on which the position detecting pattern is formed.

According to the above configuration, it is possible to clean the light emitting surface and the light receiving surface, without effects on the detection of the position of the object to be detected. That is, it is possible to clean the light emitting surface and the light receiving surface by the cleaning member, without the deterioration of the accuracy in detecting the position of the object to be detected.

Preferably, the scale is a linear scale having a long plate shape. The cleaning member is arranged at an outer side of the position detecting pattern in a longitudinal direction of the linear scale.

According to the above configuration, when the-position of the object to be detected is detected, the light emitting part and the light receiving part moving in the longitudinal direction of the linear scale are simply configured so as to further relatively move in the longitudinal direction of the linear scale when the position of the object to be detected is detected.

Preferably, the scale is a linear scale having a long plate shape. The cleaning member is arranged so as to be contiguous to the position detecting pattern in a width direction of the linear scale. According to the above configuration, it is possible to reduce the size of the position detecting device in the longitudinal direction of the linear scale.

Preferably, the scale is a rotary scale having a circular plate shape. The cleaning member is arranged at an inner diameter side of the rotary scale with respect to the position detecting pattern. According to the above configuration, it is possible to reduce the size of the position detecting device in a radial direction of the rotary scale.

Preferably, the position detecting device includes a smear detecting portion that detects the smear of the scale on the basis of a result of the light receiving part in the smear detecting pattern, a cleaning member moving device that relatively moves the cleaning member with respect to the light emitting part and the light receiving part. The scale includes a smear detecting pattern for detecting smear of the scale. The cleaning member moving device relatively moves the cleaning member to a cleaning position to clean the at least one of the light emitting surface and the light receiving surface, when the smear detecting portion detects the smear of the scale.

According to the above configuration, it is possible to remove the smear of the light emitting surface or the light receiving surface, and to suppress the incorrect detection in the position detecting device. Further, in the liquid ejecting apparatus according to an aspect of the invention, the cleaning member is fixed to the scale. Accordingly, it is possible to fix the cleaning member to the scale at positions where the cleaning member does not normally come in contact with the light emitting surface or the light receiving surface. As a result, it is possible to suppress the deterioration in accuracy in detecting the position of an object to be detected.

Further, in the liquid ejecting apparatus according to an aspect of the invention, the scale includes the smear detecting pattern in which second light transmitting parts for transmitting the light from the light emitting part and second light blocking parts for blocking the light from the light emitting part are alternately formed, in addition to the position detecting pattern used to detect the position of the object to be detected. Accordingly, when the smear detecting device has detected the smear of the scale on the basis of the light receiving results in the light receiving part of the smear detecting pattern, the cleaning member cleans the light emitting surface and the light receiving surface. That is, in the liquid ejecting apparatus according to an aspect of the invention, when the smear of the scale is detected from the detection results in the light receiving part about the light that is emitted from the light emitting part and then transmitted through the second light transmitting parts (that is, when the degree of the smear of the scale reach a predetermined limit value), it is presumed that the light emitting surface and the light receiving surface are also contaminated. Therefore, the light emitting surface and the light receiving surface are cleaned by the cleaning member. For this reason, only when the light emitting surface and the light receiving surface need to be cleaned, the light emitting surface and the light receiving surface can be cleaned by the cleaning member. That is, when the light emitting surface and the light receiving surface do not need to be cleaned, the light emitting surface and the light receiving surface are not cleaned by the cleaning member. As a result, it is possible to omit an unnecessary cleaning operation.

Preferably, the cleaning member is fixed to the scale in a region which is different from regions on which the position detecting pattern and the smear detecting pattern are formed. According to the above configuration, it is possible to clean the light emitting surface and the light receiving surface, without effects on the detection of the position and the smear of the object to be detected. That is, it is possible to clean the light emitting surface and the light receiving surface by the cleaning member, without the deterioration of the accuracy in detecting the position and the smear of the object to be detected.

Preferably, the scale is a linear scale having a long plate shape. The smear detecting pattern is arranged at an outer side of the position detecting pattern in a longitudinal direction of the linear scale. The cleaning member is arranged at an outer side of the smear detecting pattern in the longitudinal direction.

According to the above configuration, it is possible to detect the smear of the linear scale, without effects on the detection of the position of the object to be detected. When the position of the object to be detected is detected, the light emitting part and the light receiving part moving in the longitudinal direction of the linear scale are simply configured so as to further relatively move in the longitudinal direction of the linear scale when the position of the object to be detected is detected. As a result, it is possible to detect the smear of the linear scale and to clean the light emitting part and the light receiving part.

Preferably, the scale is a linear scale having a long plate shape. The smear detecting pattern is arranged at an outer side of the position detecting pattern in a longitudinal direction of the linear scale. The cleaning member is arranged so as to be contiguous to at least one of the position detecting pattern and the smear detecting pattern in a width direction of the linear scale.

According to the above configuration, it is possible to detect the smear of the linear scale, without effects on the detection of the position of the object to be detected. When the position of the object to be detected is detected, the light emitting part and the light receiving part moving in the longitudinal direction of the linear scale are simply configured so as to further relatively move in the longitudinal direction of the linear scale when the position of the object to be detected is detected. As a result, it is possible to detect the smear of the linear scale. In addition, since the cleaning member is disposed on the linear scale so as to be adjacent to the position detecting pattern and/or the smear detecting pattern in a lateral direction of the linear scale, it is possible to reduce the size of the position detecting device in the longitudinal direction of the linear scale.

Preferably, the scale is a linear scale having a long plate shape. The smear detecting pattern is arranged so as to be contiguous to the position detecting pattern in a width direction of the linear scale. The cleaning member is arranged at an outer side of at least one of the position detecting pattern and the smear detecting pattern in the longitudinal direction.

According to the above configuration, it is possible to detect the smear of the linear scale, without effects on the detection of the position, which is performed by moving the light emitting part and the light receiving part in the longitudinal direction of the linear scale, of the object to be detected. When the position of the object to be detected is detected, the light emitting part and the light receiving part moving in the longitudinal direction of the linear scale are simply configured so as to further relatively move in the longitudinal direction of the linear scale when the position of the object to be detected is detected. As a result, it is possible to clean the light emitting part and the light receiving part.

Preferably, the scale is a linear scale having a long plate shape. The smear detecting pattern is arranged so as to be contiguous to the position detecting pattern in a width direction of the linear scale. The cleaning member is arranged so as to be contiguous to at least one of the position detecting pattern and the smear detecting pattern in the width direction.

According to the above configuration, it is possible to detect the smear of the linear scale, without effects on the detection of the position of the object to be detected. In addition, it is possible to reduce the size of the position detecting device in the longitudinal direction of the linear scale.

Preferably, the scale is a rotary scale having a circular plate shape. The smear detecting pattern is arranged at an inner diameter side of the rotary scale with respect to the position detecting pattern. The cleaning member is arranged at an inner diameter side of the rotary scale with respect to the smear detecting pattern.

According to the above configuration, it is possible to detect the smear of the rotary scale, without effects on the detection of the position of the object to be detected. In addition, it is possible to reduce the size of the position detecting device in the radial direction of the rotary scale.

Preferably, the position detecting pattern has a first light transmitting portion for transmitting the light from the light emitting portion and a first light blocking portion for blocking the light from the light emitting portion which are alternately arranged in a detection range of the object. The smear detecting pattern has a second light transmitting portion for transmitting the light from the light emitting portion and a second light blocking portion for blocking the light from the light emitting portion which are alternately arranged. The second light transmitting portion is formed with a light blocking pattern so that a light transmitting area of the second light transmitting portion into which the light from the light emitting portion transmits is smaller than that of the first light transmitting portion or a light transmittivity in the second light transmitting portion is smaller than a light transmittivity in the first light transmitting portion.

According to the above configuration, it is possible to detect the smear of the scale from the detection results in the light receiving part about the light that is transmitted through the second light transmitting parts.

A liquid ejecting apparatus includes the position detecting device and a liquid ejection portion that ejects a liquid to a medium.

The liquid ejecting apparatus can remove the smear on the position detecting surface and the smear detecting surface since the cleaning member is provided. Further, an occurring of erroneous detection at the position detecting device can be suppressed. Also, the cleaning member is fixed to the scale at a position in which the cleaning member constantly comes in contact with the light emitting surface and the light receiving surface when detecting the position of the object. Therefore, a deterioration of the accuracy in a position detection of the object can be suppressed.

According to the present invention, there is also provided a method of cleaning smear of a scale having a position detecting pattern and a smear detecting pattern of a position detecting device, the method comprising:

detecting the smear of the scale in the smear detecting pattern;

moving a cleaning member to a cleaning position in which the cleaning member comes in contact with at least one of a light emitting surface and a light receiving surface of the position detecting device, when the smear of the scale is detected; and cleaning the at least one of the light emitting surface and the light receiving surface by the cleaning member.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE PREFERRED EMBODIMENTS

Hereinafter, a liquid ejecting apparatus according to an embodiment of the invention will be described with reference to accompanying drawings.

(Schematic Configuration of Liquid Ejecting Apparatus)

Figure 1:
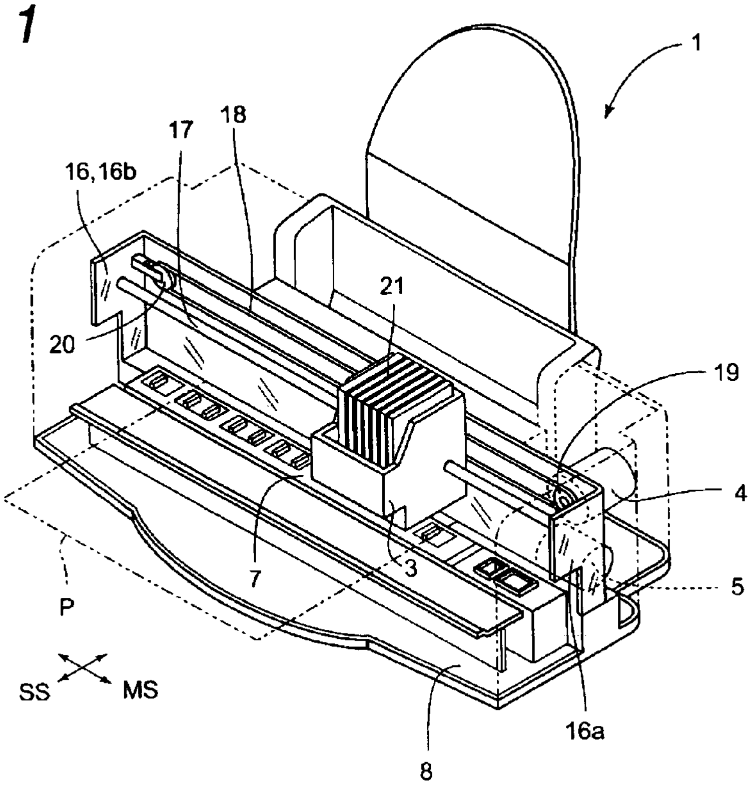
FIG. 1 is a perspective view schematically showing the configuration of a liquid ejecting apparatus (printer) according to an embodiment of the invention.
Figure 2:
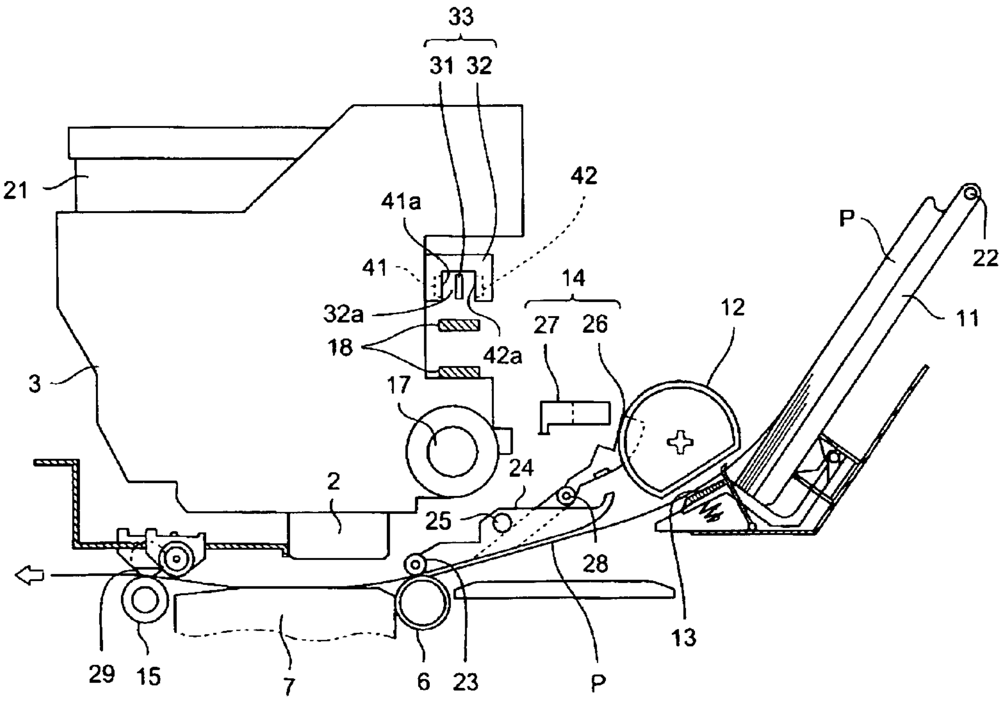
FIG. 2 is a side view schematically showing a structure for feeding paper in the printer shown in FIG. 1.
Figure 3:
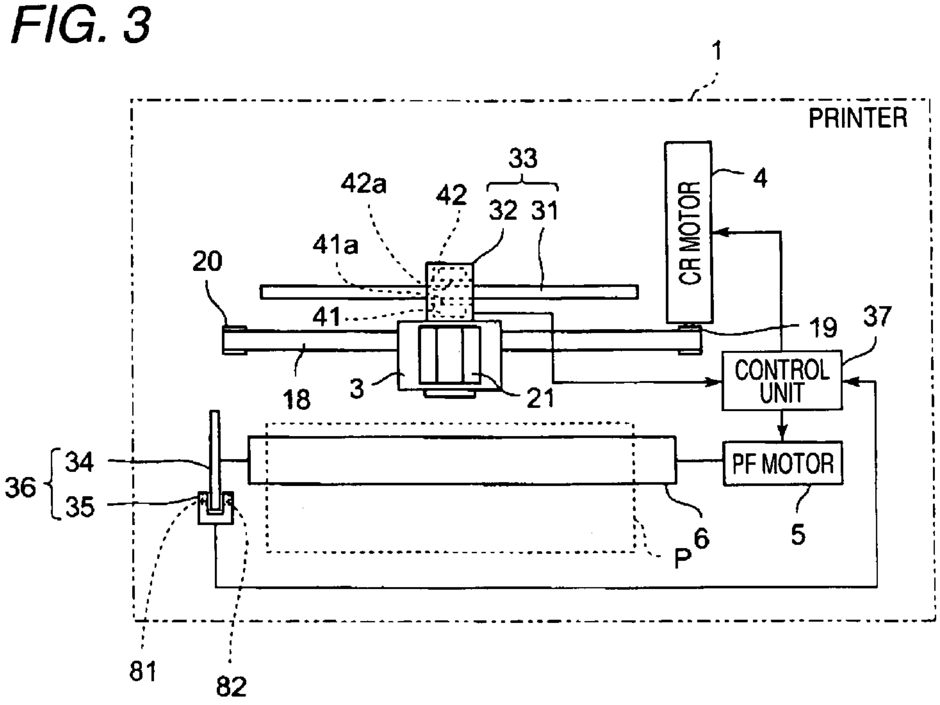
FIG. 3 is a view schematically showing a mechanism for detecting a carriage shown in FIG. 1 and a PF driving roller shown in FIG. 2.

FIG. 1 is a perspective view schematically showing the configuration of a liquid ejecting apparatus (printer) 1 according to an embodiment of the invention. FIG. 2 is a side view schematically showing a structure for feeding paper in the printer 1 shown in FIG. 1. FIG. 3 is a view schematically showing a mechanism for detecting a carriage 3 shown in FIG. 1 and a PF driving roller 6 shown in FIG. 2.

The liquid ejecting apparatus according to the present embodiment is an ink jet printer that discharges liquid ink onto a recording medium such as printing paper P to make prints. Hereinafter, the liquid ejecting apparatus 1 according to the present embodiment is referred to as a printer 1. As shown in FIGS. 1 to 3, the printer 1 according to the present embodiment includes a carriage 3 to which a printing head 2 for ejecting ink drops is mounted, a carriage motor (CR motor) 4 for driving the carriage 3 in a main scanning direction MS, a paper feed motor (PF motor) 5 for feeding the printing paper P in a sub-scanning direction SS, a PF driving roller 6 connected to the paper feed motor 5, a platen 7 disposed to face a nozzle surface (lower surface in FIG. 2) of the printing head 2, a main chassis 8 to which the above-mentioned components are mounted. In the present embodiment, each of the CR motor 4 and the PF motor 5 is a DC motor.

In addition, as shown in FIG. 2, the printer 1 includes a hopper 11 on which the printing paper P before printing is placed, a paper feed roller 12 and a separation pad 13 for feeding the printing paper P placed on the hopper 11 into the printer 1, a paper detector 14 for detecting whether the passing of the printing paper P fed from the hopper 11 into the printer 1, and a paper ejection driving roller 15 for ejecting the paper roller P from the printer 1.

Further, the right side of the printer 1 in FIG. 1 (the front side of the plane of FIG. 2) is the home position of the carriage 3. Hereinafter, the side of the home position of the carriage 3 in the printer 1 is referred to as a zero-column side, and the opposite side (the left side in FIG. 1, the rear side of the plane of FIG. 2) to the home position of the carriage 3 in the printer 1 is referred to as an eighty-column side.

The carriage 3 includes a guide frame 17, which is supported by a supporting frame 16 fixed to the main chassis 8, and a timing belt 18 so as to be transported in the main scanning direction MS. That is, a portion of the timing belt 18 is fixed to the carriage 3 (see FIG. 2), and the belt is wound on a pulley 19 fixed to an output shaft of the CR motor 4 to have a predetermined tension. The carriage 3 is slidably supported by the guide shaft 17 so that the guide shaft 17 guides the carriage 3 in the main scanning direction MS. Further, the carriage 3 is provided with ink cartridges 21 that store various inks to be supplied to the printing head 2 in addition to the printing head 2.

For example, the printing head 2 is provided with a plurality of nozzles not shown in drawings. In addition, the printing head 2 is provided with a piezoelectric element (not shown), which is an electrostrictive element and has an excellent responsiveness, so as to response each nozzle. More specifically, the piezoelectric element is disposed at a position that comes in contact with a wall forming an ink passage (not shown). Further, the wall is pushed by the piezoelectric element due to the operation of the piezoelectric element, the printing head 2 discharges ink drops from the ink nozzle provided at the end of the ink passage. Accordingly, in the present embodiment, the printing head 2 is composed of a liquid ejecting device that discharges liquid ink onto the printing paper P. In addition, the ink cartridge 21 store, for example, dye ink that has an excellent color forming property and an excellent image quality, pigment ink that has excellent water resistance and light resistance, and the like.

The paper feed roller 12 is connected to the PF motor 5 through a gear (not shown) so as to be driven by the PF motor 5. As shown in FIG. 2, the hopper 11 is a plate-shaped member on which the printing paper P can be placed, and can be swung on a rotary shaft 22 provided on the upper side of the hopper by a cam mechanism (not shown). Further, when the hopper is swung by the cam mechanism, the lower end of the hopper 11 elastically comes in press contact with the paper feed roller 12 or is spaced apart from the paper feed roller 12. The separation pad 13 is formed of a member having a high coefficient of friction, and is disposed so as to face the paper feed roller 12. Moreover, when the paper feed roller 12 is rotated, the surface of the paper feed roller 12 and the separation pad 13 come in press contact with each other. Accordingly, when the paper feed roller 12 is rotated, the uppermost printing paper P of the printing paper P placed on the hopper 11 passes through the press-contact portion between the surface of the paper feed roller 12 and the separation pad 13 so as to be fed to a paper discharge side. However, the separation pad 13 prevents the printing paper P, which is placed below the uppermost printing paper, from being fed to the paper discharge side.

The PF driving roller 6 is directly connected to the PF motor 5, or is connected to the PF motor 5 through a gear (not shown). In addition, as shown in FIG. 2, the printer 1 is provided with the PF driving roller 6 and a PF driven roller 23 for feeding the printing paper P. The PF driven roller 23 is rotatably supported on the paper discharge side of a driven roller holder 24 that can be swung on a rotary shaft 25. The driven roller holder 24 is pushed counterclockwise by a spring (not shown) so that a bias force is always applied to the PF driven roller 23 toward the PF driving roller 6. When the PF driving roller 6 is driven, the PF driven roller 6 as well as the PF driving roller 6 are rotated.

As shown in FIG. 2, the paper detector 14 includes a detection lever 26 and a sensor 27, and is provided near the driven roller holder 24. The detection lever 26 is provided so as to rotate on a rotary shaft 28. When the printing paper P completely passes through the lower side of the detection lever 26 from the state in which the printing paper P passes as shown in FIG. 2, the detection lever 26 is rotated counterclockwise. When the detection lever 26 is rotated, the passing of the printing paper P is detected by the interruption of light that is emitted from a light-emitting part of the sensor 27 toward a light-receiving part of the sensor 27.

The paper ejection driving roller 15 is disposed on the paper discharge side of the printer 1, and is connected to the PF motor 5 through a gear (not shown). In addition, as shown in FIG. 2, the printer 1 is provided with a paper ejection driven roller 29 for ejecting the printing paper P in addition to the paper ejection driving roller 15. Like the PF driven roller 23, the paper ejection driven roller 29 is also pushed by a spring (not shown) so that a bias force is always applied to the paper ejection driven roller 29 toward the PF driving roller 6. When the paper ejection driving roller 15 is driven, the paper ejection driven roller 29 as well as the paper ejection driving roller 15 are rotated.

Further, as shown in FIGS. 2 and 3, the printer 1 includes a linear encoder 33, which includes a linear scale 31 and a photosensor 32. The linear encoder 33 serves as a position detector that detects the position of the carriage 3 or the speed of the carriage 3 in the main scanning direction MS. Furthermore, as shown in FIG. 3, the printer 1 includes a rotary encoder 36, which includes a rotary scale 34 and a photosensor 35. The rotary encoder 36 serves as a position detector that detects the position of the printing paper P or the feeding speed of the printing paper P in the sub-scanning direction SS. As shown in FIG. 3, signals output from the linear encoder 33 and the rotary encoder 26 are input to a control unit 37 so that various controls are performed on the printer 1. In addition, in the present embodiment, the carriage 3 is an object to be detected of which position is detected by the linear encoder 33, and the PF driving roller 6 is an object of which position is detected by the rotary encoder 36. The linear scale 31 is not shown in FIG. 1, for convenience sake.

The linear scale 31 is formed of a thin plate made of transparent resin so as to have an elongated shape (elongated line shape). The linear scale 31 is mounted to the supporting frame 16 so as to be parallel to the main scanning direction MS. That is, in the printer 1, the linear scale 31 is mounted to the supporting frame 16 so that the lateral direction of the linear scale 31 is defined as a height direction. Further, the linear scale 31 is configured so as to move up and down with respect to the supporting frame 16 by a lifting mechanism 44 (see FIG. 4) to be described below. In addition, the linear scale 31 may be formed of a thin plate made of stainless steel.

As shown in FIGS. 2 and 3, the photosensor 32 forming the linear encoder 33 includes a light emitting part 41 and a light receiving part 42, and is fixed to the carriage 3. More specifically, the photosensor 32 is fixed to the backside (the rear side of the plane of FIG. 1) of the carriage 3. The linear scale 31 and the photosensor 32 will be described below in detail.

As shown in FIG. 3, the photosensor 35 forming the rotary encoder 36 includes a light emitting part 81 having a light emitting element (not shown) and a light receiving part 82 having light receiving elements (not shown), and is fixed to the main chassis 8 through a bracket (not shown).

The rotary scale 34 is formed of a thin plate made of stainless steel or transparent resin so as to have a disk shape. The rotary scale 34 of the present embodiment is mounted to the PF driving roller 6 so as to be integrally rotated with the PF driving roller 6. That is, when the PF driving roller 6 is rotated, the rotary scale 34 is also rotated. Light transmitting parts (not shown) for transmitting light from the light emitting element of the photosensor 35, and light blocking parts (not shown) for blocking light from the light emitting element of the photosensor 35 are alternately formed in the rotary scale 34 in a circumferential direction of the rotary scale. In the rotary encoder 36, the light receiving elements receive light, which is emitted from the light emitting element toward the rotary scale 34 and transmitted through the light transmitting parts of the rotary scale 34, and predetermined output signals are output.

When the rotary scale 34 is formed of a thin plate made of transparent resin, patterns with a predetermined width are printed on the surface of the rotary scale 34 at a predetermined pitch in the circumferential direction of the rotary scale so as to form the light transmitting parts and the light blocking parts. When the rotary scale 34 is formed of a thin plate made of stainless steel, slits passing through the thin plate made of stainless steel are formed in the thin plate at a predetermined pitch in the circumferential direction thereof so as to form the light transmitting parts and the light blocking parts. Further, the rotary scale 34 may be connected to the PF driving roller 6 through a gear or the like. However, since the rotary scale 34 is directly connected to the PF driving roller 6 so as to be integrally rotated with the PF driving roller 6, it is possible to allow the rotation angle of the rotary scale 34 and the rotation angle of the PF driving roller 6 to correspond to each other one-to-one.

The control unit 37 includes various memories such as ROM and RAM, driving circuits for the various motors, a CPU, an ASIC, and the like. Output signals from the linear encoder 33 and the rotary encoder 36 are input to the CPU and the ASIC. Further, in the present embodiment, the control unit 37 serves as a smear detecting device for detecting the smear of the linear scale 31 on the basis of the light receiving results of the light receiving part 42 when the photosensor 32 passes through a smear detecting pattern 31*c* (to be described below) formed in the linear scale 31.

(Configuration of Scale Lifting Mechanism)

Figure 4:
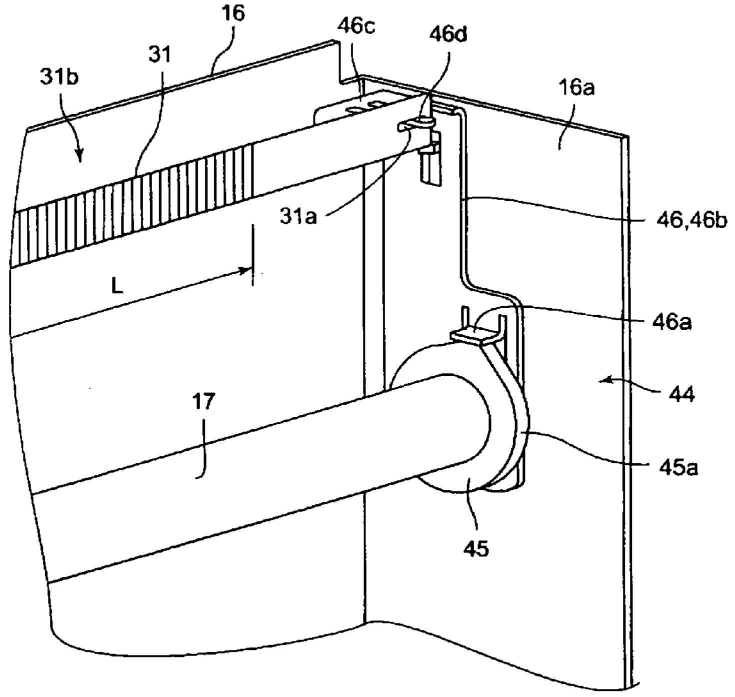
FIG. 4 is a perspective view schematically showing a state in which one end of the linear scale shown in FIG. 3 is mounted.
Figure 5:
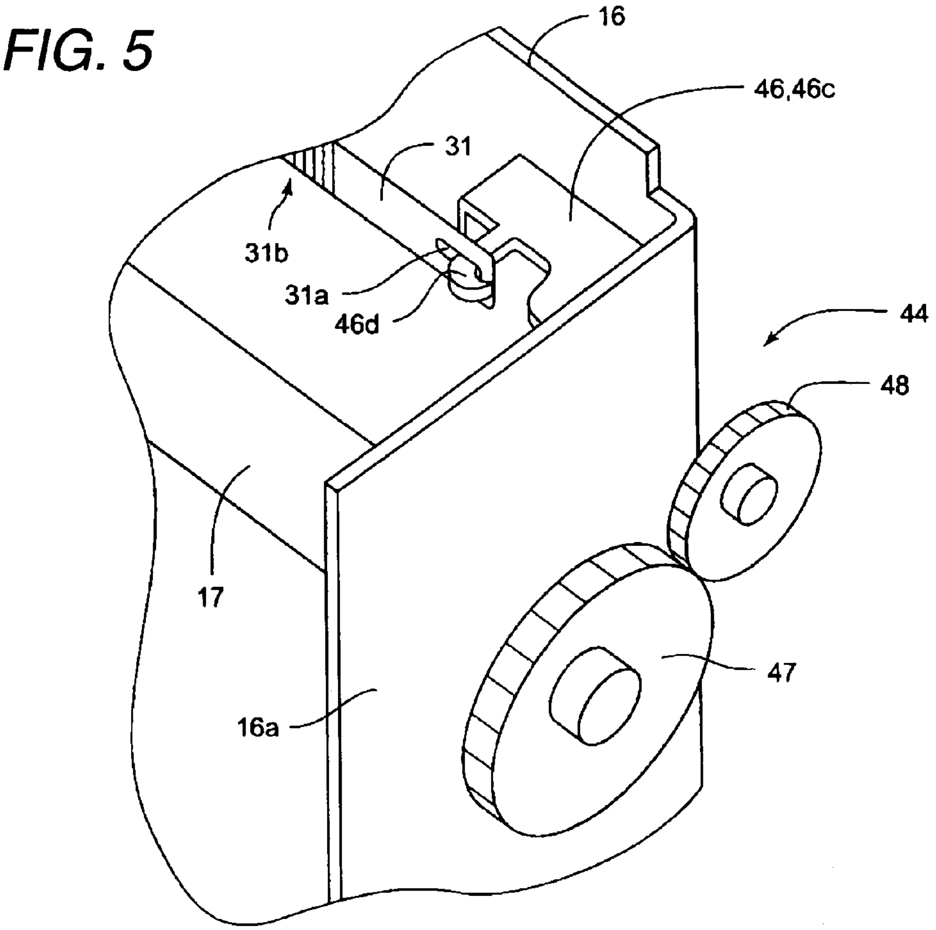
FIG. 5 is a perspective view schematically showing a state in which one end of the linear scale is mounted, as seen from the rear side of the plane of FIG. 4.
Figure 6:
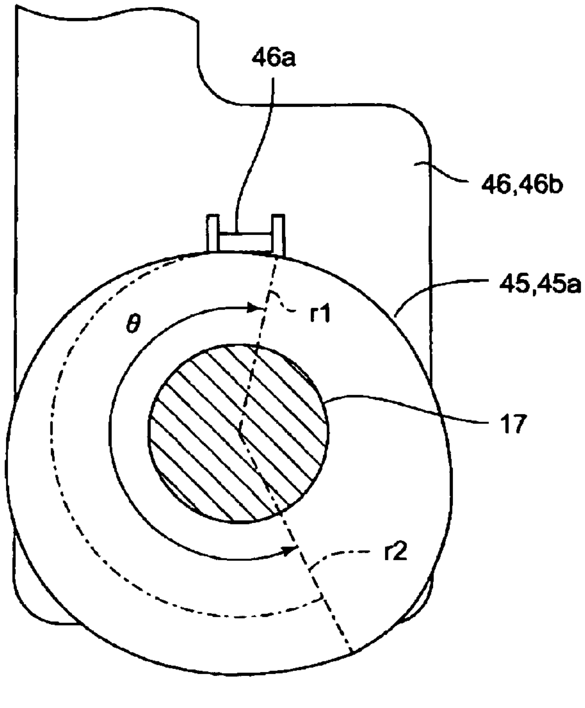
FIG. 6 is a view showing the relationship between a cam and a mounting bracket of FIG. 4.

FIG. 4 is a perspective view schematically showing a state in which one end of the linear scale 31 is mounted. FIG. 5 is a perspective view schematically showing a state in which one end of the linear scale 31 is mounted, as seen from the rear side of the plane of FIG. 4. FIG. 6 is a view showing the relationship between a cam 45 and a mounting bracket 46 of FIG. 4.

The printer 1 of the present embodiment includes a scale lifting mechanism 44 for lifting the linear scale 31 with respect to the supporting frame 16. That is, as described above, the linear scale 31 can move up and down by the scale lifting mechanism 44 with respect to the supporting frame 16. In the present embodiment, the linear scale 31 is positioned, for example, at a position near an upper limit position in an initial state, and can move up and down by the scale lifting mechanism 44.

As shown in FIGS. 4 and 5, the scale lifting mechanism 44 includes an eccentric cam 45, a mounting bracket 46, a driven gear 47, and an intermediate gear 48. The eccentric cam 45 is fixed to a guide shaft 17 inside one part 16*a* (right part in FIG. 1) of the supporting frame 16. The mounting bracket 46 is mounted to one end (end on a zero-column side) of the linear scale 31, and moves up and down together with the linear scale 31 by the eccentric cam 45. The driven gear 47 is fixed to the front end of the guide shaft 17 outside one part 16*a*. The intermediate gear transmits power from a driving motor (not shown) to the driven gear 47. In addition, the scale lifting mechanism 44 also includes an eccentric cam 45, a mounting bracket 46, a driven gear 47, an intermediate gear 48, and a driving motor (not shown) on the other part 16*b*. The configurations of the above-mentioned components are the same as those of the components provided on one part 16*a*. Therefore, the components on the other part 16*b* will not be shown nor described below. The scale lifting mechanism 44 is not shown in FIG. 1, for convenience sake.

In the present embodiment, the driven gear 47 fixed to the guide shaft 17 is rotated by the power transmitted from the driving motor (not shown) through the intermediate gear 48. That is, in the present embodiment, the guide shaft 17 is rotated together with the driven gear 47. Further, the eccentric cam 45 fixed to the guide shaft 17 is also rotated. The intermediate gear 48 may be directly connected to the driving motor (not shown), or may be connected to the driving motor through a predetermined gear train.

The eccentric cam 45 is a substantially disk-shaped member that has a cam surface 45*a* on the outer circumference thereof. As shown in FIG. 6, the eccentric cam 45 is formed to have a radius that continuously changes from a radius r1 to a radius r2, which is larger than the radius r1 with respect to the center of rotation at a predetermined angle range 0.

The mounting bracket 46 is formed of, for example, a plate-shaped metal member, and includes a base part 46*b* and a mounting part 46*c*. The base part 46*b* has a contact part 46*a* coming in contact with the cam surface of the eccentric cam 45, and the end of the linear scale 31 is mounted to the mounting part 46*c*.

The base part 46*b* is provided with a through hole (not shown) having an elongated slot shape in an up-and-down direction so that the guide shaft 17 is inserted into the base part 46*b*. The through hole is formed so that the mounting bracket 46 can move up and down with respect to the guide shaft 17. As shown in FIG. 4, when the guide shaft 17 is inserted into the through hole, the base part 46*b* is interposed between the eccentric cam 45 and one part 16*a* of the supporting frame 16. The contact part 46*a* protrudes from the base part 46*b* toward the inside of the printer 1. The lower surface of the contact part 46*a* in the drawing comes in contact with the cam surface 45*a*. In addition, the contact part 46*a* protrudes from the upper end of the base part 46*b* in the drawing toward the inside of the printer 1. The mounting part 46*c* is provided with a hook 46*d* that is caught in mounting holes 31*a* (to be described below) formed in the linear scale 31. Further, the mounting bracket 46 is guided by a guide member (not shown) so as to move up and down without the inclination thereof.

When the driving motor (not shown) is driven and the guide shaft 17 and the eccentric cam 45 are rotated, the contact part 46 is lifted along the cam surface 45*a*. That is, the linear scale 31 mounted to the mounting bracket 46 is lifted. For example, as shown in FIG. 6, when the eccentric cam 46 is rotated clockwise, the linear scale 31 is lifted. Further, the mounting bracket 46 provided on one part 16*a* of the supporting frame 16 and the mounting bracket 46 provided on the other part 16*b* are configured to be lifted in synchronization with each other. Furthermore, while being kept horizontal, the linear scale 31 is lifted.

(Configuration of Linear Encoder)

Figure 7:
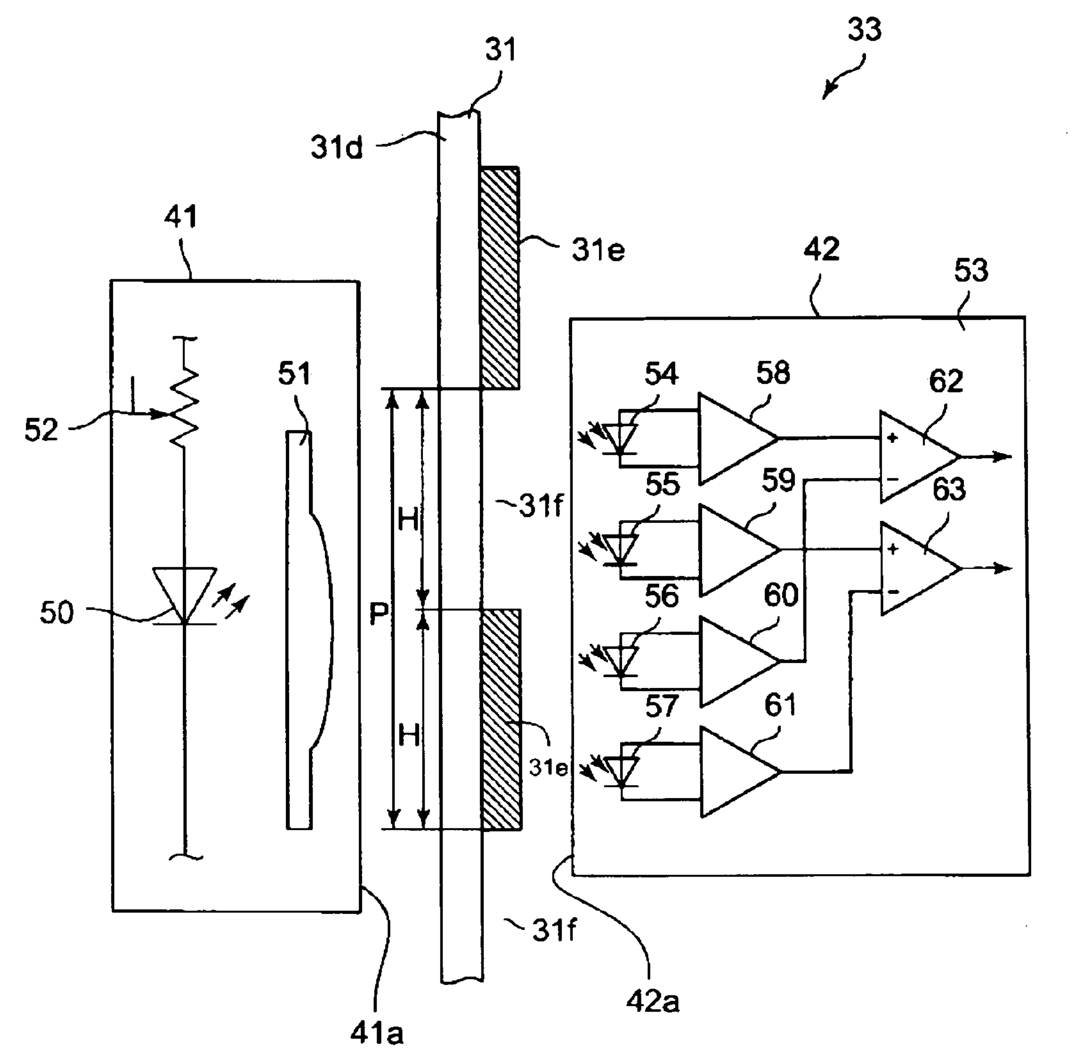
FIG. 7 is a view schematically showing the configuration of a linear encoder of FIG. 3.
Figure 8A:
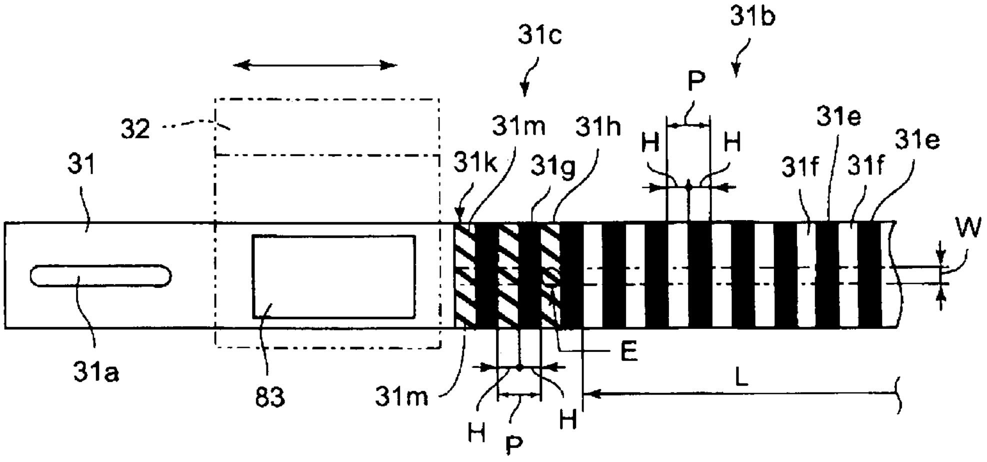
FIGS. 8A and 8B are views showing the eighty-column side of a linear scale of FIG. 3.
Figure 8B:
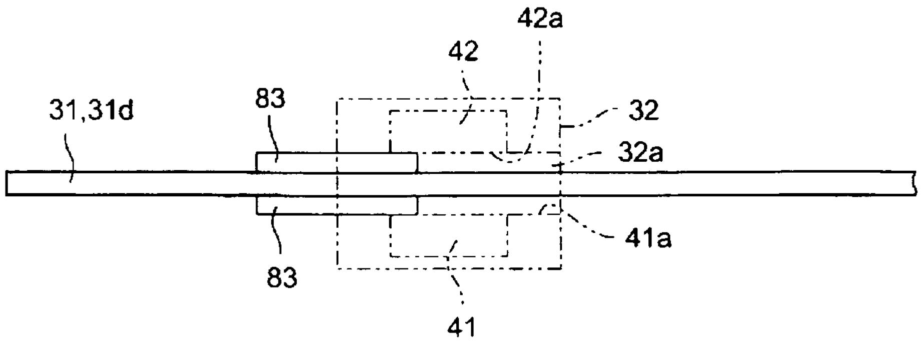
Figure 9A:
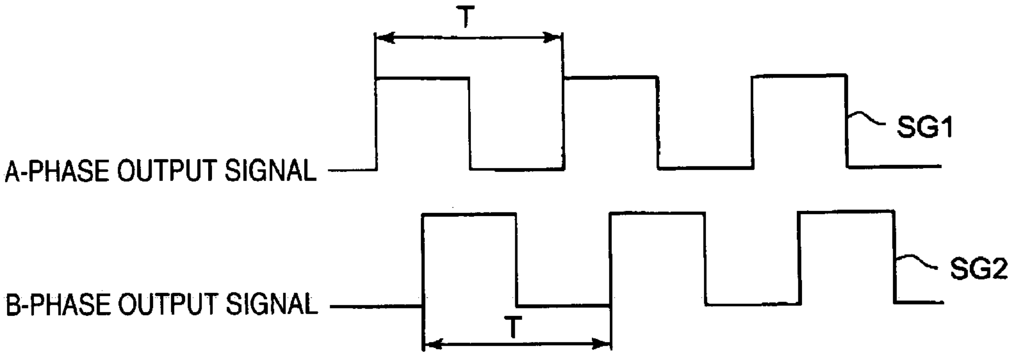
FIGS. 9A and 9B are diagrams showing waveforms of signals output from the linear encoder of FIG. 3.
Figure 9B:
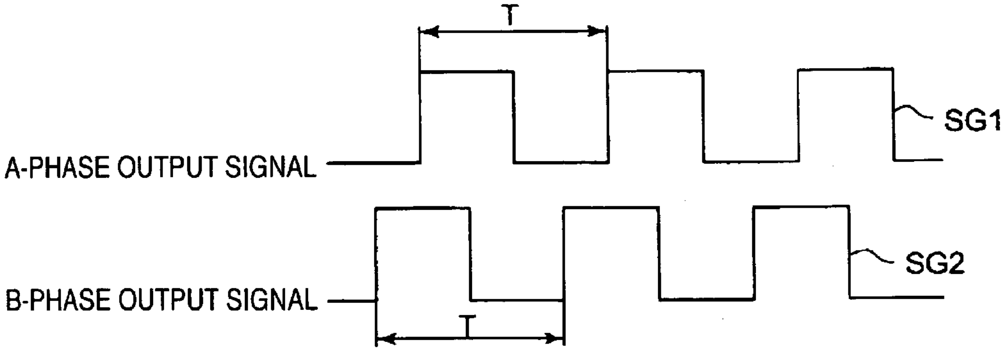

FIG. 7 is a view schematically showing the configuration of the linear encoder 33 of FIG. 3. FIGS. 8A and 8B are views showing the eighty-column side of the linear scale 31 of FIG. 3. FIG. 8A is a front view of the linear scale 31, and FIG. 8B is a top view of the linear scale 31. FIGS. 9A and 9B are diagrams showing waveforms of signals output from the linear encoder 33 of FIG. 3. FIG. 9A is a diagram showing waveforms of signals when the carriage 3 moves from the zero-column side to the eighty-column side, and FIG. 9B is a diagram showing waveforms of signals when the carriage 3 moves from the eighty-column side to the zero-column side.

As described above, the linear scale 31 is formed of a thin plate made of transparent resin so as to have an elongated shape. More specifically, the linear scale 31 of the present embodiment is formed of, for example, transparent polyethylene terephthalate (PET) so as to have a thickness of 180 μm. Substantially rectangular mounting holes 31*a*, which catches the hook 46*d* of the mounting bracket 46, are formed at both ends of the linear scale 31 in the longitudinal direction thereof. In addition, as shown in FIGS. 8A and 8B and the like, the linear scale 31 includes a position detecting pattern 31*b* used to detect the position of the carriage 3 and a smear detecting pattern 31*c* used to detect the smear of the linear scale 31.

The position detecting pattern 31*b* is formed as described below. That is, black patterns or the like for blocking light are printed on one surface of the linear scale 31 at a predetermined pitch in the detection range L (see FIGS. 4 and 8) of the carriage 3 in which the position needs to be detected, so as to print the printing paper P. More specifically, black patterns with a predetermined width H are printed on one surface (right surface in FIG. 7) of a base material 31*d* made of PET at a predetermined pitch P in the detection range L, as shown in FIG. 7. That is, in the detection range L, the black patterns with a predetermined width H are printed on the linear scale in the lateral direction thereof so as to have a pitch P in the main scanning direction MS and so as to form lateral stripes (see FIGS. 4 and 5). The black patterns serve as first light blocking parts 31*e* for blocking the light emitted from the light emitting part 41 of the photosensor 32. In addition, the portions on which the black patterns are not printed between the first light blocking parts 31*e* serve as first light transmitting parts 31*f* for transmitting the light emitted from the light emitting part 41. As described above, in the detection range L, the first light blocking parts 31*e* and the first light transmitting parts 31*f* are alternately formed in the linear scale 31. Each of the first light transmitting parts 31*f* has a predetermined width H, like the first light blocking parts 31*e*.

The smear detecting pattern 31*c* is disposed on the linear scale 31 outside the position detecting pattern 31*b* (on the side of the ends) in the longitudinal direction of the linear scale 31. In the present embodiment, as shown in FIG. 8A, the smear detecting pattern 31*c* is formed on the eighty-column side of the linear scale 31 so as to be adjacent to the outside of the position detecting pattern 31*b*.

The smear detecting pattern 31*c* has substantially the same shape as the position detecting pattern 31*b*. That is, black patterns or the like for blocking light are printed on the surface, having the first light blocking parts 31*e*, of the linear scale 31 out of the detection range L on the eighty-column side of the linear scale 31 at a predetermined pitch. More specifically, black patterns with a predetermined width H are printed on the right surface of the base material 31*d* shown in FIG. 7 at a predetermined pitch P. That is, as shown in FIG. 8A, even outside the detection range L on the eighty-column side, the black patterns with a predetermined width H are printed on the linear scale in the lateral direction thereof so as to have a pitch P in the longitudinal direction of the linear scale and so as to form lateral stripes. The black patterns serve as second light blocking parts 31*g* for blocking the light emitted from the light emitting part 41 of the photosensor 32. In addition, the portions on which the black patterns are not printed between the second light blocking parts 31*g* serve as second light transmitting parts 31*h* for transmitting the light emitted from the light emitting part 41. As described above, the second light blocking parts 31*g* and the second light transmitting parts 31*h* are alternately formed in the linear scale 31 outside the detection range L on the eighty-column side of the linear scale 31. Each of the second light transmitting parts 31*h* has a predetermined width H, like the second light blocking parts 31*g*.

Light blocking patterns 31*k* are formed in the second light transmitting parts 31*h*. The light blocking patterns 31*k* reduce the light transmission area and light transmissivity of the second light transmitting parts 31*h* through which the light emitted from the light emitting part 41 are transmitted so that the light transmission area and light transmissivity of the second light transmitting parts are smaller than those of the first light transmitting parts 31*f*. In the present embodiment, the light blocking patterns 31*k* are formed by light blocking portions 31*m* having an oblique line shape that are inclined with respect to the longitudinal direction of the linear scale 31. More specifically, black patterns or the like for blocking light are printed on the surface of the base material 31*d* at a predetermined pitch P so as to have an oblique line shape inclined by 45° with respect to the longitudinal direction, thereby forming the plurality of light blocking portions 31*m*. Then, the light blocking patterns 31*k* are formed by the plurality of light blocking portions 31*m*. The light blocking patterns 31*k* allow the light transmission area of the second light transmitting parts 31*h* to have a predetermined ratio with respect to the light transmission area of the first light transmitting parts 31*f*. That is, the light transmissivity of the second light transmitting parts 31*h* has a predetermined ratio with respect to the light transmissivity of the first light transmitting parts 31*f*. For example, the light transmission area of the second light transmitting parts 31*h* has a ratio of 85% with respect to the light transmission area of the first light transmitting parts 31*f*. Further, the light transmissivity of the second light transmitting parts 31*h* may have a ratio of 85% with respect to the light transmissivity of the first light transmitting parts 31*f*.

In the present embodiment, as shown in FIG. 8A, the linear scale 31 is provided with a plurality of (for example, three) second light transmitting parts 31*h*, and the plurality of second light transmitting parts 31*h* have the same light transmission area and light transmissivity from each other. However, it is not necessary that the plurality of second light transmitting parts 31*h* have the same light transmission area and light transmissivity from each other, and the plurality of second light transmitting parts 31*h* may have light transmission area and light transmissivity different from each other. Further, the thickness of each black pattern which forms the first light blocking parts 31*e*, the second light blocking parts 31*g*, and the light blocking portions 31*m*, is, for example, 5 μm, which is significantly thin as compared to the thickness of the base material 31*d*. For this reason, in FIG. 8B, the first light blocking parts 31*e*, the second light blocking parts 31*g*, and the light blocking portions 31*m* are omitted in the drawings.

As shown in FIGS. 8A and 8B, cleaning members 83 and 83, which clean the light emitting part 41 and the light receiving part 42, are fixed to the linear scale 31. More specifically, the cleaning members 83 and 83, which are formed in a flat and rectangular shape, are fixed to both surfaces of the linear scale 31 outside (on the side of the end) the smear detecting pattern 31*c* in the longitudinal direction of the linear scale 31, by an adhesive means such as a double-sided tape or an adhesive. That is, the cleaning members 83 and 83 are fixed to the linear scale 31 outside (on the side of the end) the position detecting pattern 31*b* in the longitudinal direction of the linear scale 31. In other words, the cleaning members 83 and 83 are fixed to the linear scale 31 in regions on which the position detecting pattern 31*b* and the smear detecting pattern 31*c* are not formed. In other word, the cleaning members 83 and 83 are fixed to the linear scale 31 at an area which is different from an area on which the position detecting pattern 31*b* is formed. In the present embodiment, as shown in FIGS. 8A and 8B, the cleaning members 83 and 83 are fixed to the linear scale 31 on the eighty-column side so as to be adjacent to the outside of the position detecting pattern 31*b*.

For example, the cleaning members 83 and 83 are formed of porous material, such as urethane resin, felt, rubber, or the like. In addition, as shown in FIG. 8B, the two cleaning members 83 and 83 are formed so that the sum of the two cleaning members 83 and 83 and the base material 31*d* of the linear scale 31 is substantially equal to or slightly larger than the distance between a light emitting surface 41*a* and a light receiving surface 42*a*. The light emitting surface 41*a* is formed in the light emitting part 41 and will be described below. The light receiving surface 42*a* is formed in the light receiving part 42 and will be described below. Accordingly, when the photosensor 32 moves in the longitudinal direction of the linear scale 31, the cleaning members 83 and 83 come in contact with the light emitting surface 41*a* and the light receiving surface 42*a* so as to clean the light emitting surface 41*a* and the light receiving surface 42*a*.

As shown in FIGS. 2 and 3, the photosensor 32 includes a housing having a substantially rectangular shape. A recess 32*a* is formed in the photosensor 32 from one side surface (lower surface in FIG. 2) of the housing to the central portion. The light emitting part 41 is provided on one surface of two surfaces (two surfaces facing each other in a horizontal of FIG. 2) facing each other in the recess 32*a*, and the light receiving part 42 is provided on the other surface. More specifically, as shown in FIG. 2 and the like, the light emitting part 41 is provided on the surface closer to the carriage 3. One surface, which has the light emitting part 41, of the two surfaces facing each other in the recess 32*a* is the light emitting surface 41*a*, and the other surface having the light receiving part 42 is the light receiving surface 42*a*. The distance between the light emitting surface 41*a* and the light receiving surface 42*a* is in the range of, for example, 0.5 to 1.5 mm.

Further, as shown in FIG. 2 and the like, the photosensor 32 is fixed to the carriage 3 so that the linear scale 31 is interposed between the light emitting surface 41*a* of the light emitting part 41 and the light receiving surface 42*a* of the light receiving part 42. In the linear encoder 33, the light receiving part 42 receives the light that is emitted from the light emitting part 41 toward the linear scale 31 and then transmitted through the first light transmitting parts 31*f* and the second light transmitting parts 31*h*, and predetermined output signals are output.

As shown in FIG. 7, the light emitting part 41 includes a light emitting element 50, and a collimator lens 51 for collimating the light emitted from the light emitting element 50. A lens (not shown) for transmitting the light from the light emitting element 50 is fixed to the light emitting surface 41*a*. For example, the light emitting element 50 is a light emitting diode. Current is supplied to the light emitting element 50 through a variable resistor 52. Accordingly, it is possible to reduce the amount of light emitted from the light emitting element 50, by the variable resistor 52. In an initial state, it is preferable that the amount of the light emitted from the light emitting element 50 is as small as possible in the range in which the position of the carriage can be properly detected by the linear encoder 33. Therefore, it is possible to reduce power consumption in the light emitting part 41.

As shown in FIG. 7, the light receiving part 42 includes a substrate 53, and four light receiving elements 54 to 57 formed on the substrate 53. A lens (not shown) for transmitting the light from the light emitting element 50 is fixed to the light receiving surface 42*a*. For example, each of the light receiving elements 54 to 57 is a photodiode, and outputs a signal corresponding to the level of the amount of the received light. As shown in FIG. 7, the light receiving part 42 includes first to fourth amplifiers 58 to 61, and a first differential signal generating circuit 62, and a second differential signal generating circuit 63. Hereinafter, when the four light receiving elements 54 to 57 are indicated in distinction from each other, the four light receiving elements are indicated as the first light receiving element 54, the second light receiving element 55, the third light receiving element 56, and the fourth light receiving element 57.

The four light receiving elements 54 to 57 are disposed on the substrate 53 in the moving direction of the carriage 3. Specifically, the first light receiving element 54 and the third light receiving element 56 are disposed so that the relative phase between level signals output from them is 180°. The second light receiving element 55 and the fourth light receiving element 57 are disposed so that the relative phase between level signals output from them is 180°. For example, each of the disposition pitches between the first light receiving element 54 and the third light receiving element 56, and between the second light receiving element 55 and the fourth light receiving element 57 is a half of a pitch P of light and darkness formed by the first light blocking parts 31*e* and the first light transmitting parts 31*f*. Further, the first light receiving element 54 and the second light receiving element 55 are disposed so that the relative phase between level signals output from them is 90°. For example, the first light receiving element 54 and the second light receiving element 55 are disposed at a disposition pitch that is a quarter of the pitch P of light and darkness.

When the carriage 3 moves, the linear scale 31 relatively moves between the light emitting part 41 and the light receiving part 42. As the linear scale 31 relatively moves, the light receiving elements 54 to 57 output the signals corresponding to the levels of the amount of the received light in the light receiving elements. That is, the light receiving elements 54 to 57, which correspond to the positions of the first light transmitting parts 31*f* or the second light transmitting parts 31*h*, output high-level signals. Further, the light receiving elements 54 to 57, which correspond to the positions of the first light blocking parts 31*e* or the second light blocking parts 31*g*, output the low-level signals. Accordingly, the light receiving elements 54 to 57 output signals that change per cycle corresponding to the relative speed of the linear scale 31 (the speed of the carriage 3).

As shown in FIG. 7, first to fourth amplifiers 58 to 61, a first differential signal generating circuit 62, and a second differential signal generating circuit 63 are disposed on the substrate 53.

The first light receiving element 54 is connected to the first amplifier 58, and the first amplifier 58 amplifies the level signal output from the first light receiving element 54 and outputs the amplified signal. The second light receiving element 55 is connected to the second amplifier 59, and the second amplifier 59 amplifies the level signal output from the second light receiving element 55 and outputs the amplified signal. The third light receiving element 56 is connected to the third amplifier 60, and the third amplifier 60 amplifies the level signal output from the third light receiving element 56 and outputs the amplified signal. The fourth light receiving element 57 is connected to the fourth amplifier 61, and the fourth amplifier 61 amplifies the level signal output from the fourth light receiving element 57 and outputs the amplified signal.

The first amplifier 58 and the third amplifier 60 output the amplified level signals to the first differential signal generating circuit 62. A level signal amplified by the first amplifier 58 is input to a non-inverting input terminal of the first differential signal generating circuit 62, and a level signal amplified by the third amplifier 60 is input to an inverting input terminal of the first differential signal generating circuit 62. When the level of the signal that is output from the first amplifier 58 and then input to the non-inverting input terminal is higher than the level of the signal that is output from the third amplifier 60 and then input to the inverting input terminal, the first differential signal generating circuit 62 outputs a high-level signal. In a reverse case, the first differential signal generating circuit 62 outputs a low-level signal. That is, as shown in FIGS. 9A and 9B, the first differential signal generating circuit 62 outputs an A-phase signal SG1 that has a digital waveform having a cycle corresponding to the pitch P of light and darkness formed by the first light blocking parts 31*e* and the first light transmitting parts 31*f*.

The second amplifier 59 and the fourth amplifier 61 output the amplified level signals to the second differential signal generating circuit 63. A level signal amplified by the second amplifier 59 is input to a non-inverting input terminal of the first differential signal generating circuit 63, and a level signal amplified by the fourth amplifier 61 is input to an inverting input terminal of the second differential signal generating circuit 63. When the level of the signal that is output from the second amplifier 59 and then input to the non-inverting input terminal is higher than the level of the signal that is output from the fourth amplifier 61 and then input to the inverting input terminal, the second differential signal generating circuit 63 outputs a high-level signal. In a reverse case, the second differential signal generating circuit 63 outputs a low-level signal. That is, as shown in FIGS. 9A and 9B, the second differential signal generating circuit 63 outputs a B-phase signal SG2 that has a digital waveform having a cycle corresponding to the pitch P of light and darkness formed by the first light blocking parts 31*e* and the first light transmitting parts 31*f*.

As described above, the relative phase between the level signal output from the first light emitting element 54 and the level signal output from the second light emitting element 55 is 90°. For this reason, as shown in FIGS. 9A and 9B, the relative phase between the A-phase signal SG1 output from the first differential signal generating circuit 62 and the B-phase signal SG2 output from the second differential signal generating circuit 63 is 90°.

FIG. 9A shows waveforms of signals when the carriage 3 moves from the zero-column side to the eighty-column side, and FIG. 9B shows waveforms of signals when the carriage 3 moves from the eighty-column side to the zero-column side. That is, as shown in FIG. 9A, when the B-phase signal SG2 is in low level and the A-phase signal SG1 rises (or when the B-phase signal SG2 is in high level and the A-phase signal SG1 falls), the carriage 3 moves from the zero-column side to the eighty-column side. Further, as shown in FIG. 9B, when the B-phase signal SG2 is in low level and the A-phase signal SG1 falls (or when the B-phase signal SG2 is in high level and the A-phase signal SG1 rises), the carriage 3 moves from the eighty-column side to the zero-column side.

The light emitted from the light emitting part 41 is radiated onto the linear scale 31, as shown in FIG. 8A, with a predetermined width W in the lateral direction (the vertical direction in FIG. 8A) of the linear scale 31. More specifically, even though the light blocking portions 31*m* having an oblique line shape are formed in the second light transmitting parts 31*h*, if the second light transmitting parts 31*h* are not contaminated, light with a predetermined width W is radiated onto the linear scale 31 from the light emitting part 41 so that portions for completely blocking the light emitted from the light emitting part 41 are not formed on a part of the second light transmitting parts 31*h* in the longitudinal direction of the linear scale 31. Accordingly, even though the light blocking portions 31*m* are formed in the second light transmitting parts 31*h*, if the linear scale 31 is not contaminated and the carriage 3 moves at a predetermined speed, when the photosensor 32 passes through the portions having the smear detecting pattern 31*c* in the linear scale 31, the linear encoder 33 outputs an A-phase signal SG1 and a B-phase signal SG2 having the same cycle as when the photosensor 32 passes through the portions having the position detecting pattern 31*b* in the linear scale 31.

(Schematic Operation of Printer)

In the printer 1 configured as described above, printing paper P, which is fed from the hopper 1 1 into the printer 1 by the paper feed roller 12 and the separation pad 13, is fed in the sub-scanning direction SS by the PF driving roller 6 that is driven by the PF motor 5. In this case, the carriage 3 driven by the CR motor 4 reciprocates in the main scanning direction MS. When the carriage 3 reciprocates, the printing head 2 discharges ink drops to print the printing paper P. In addition, when the printing onto the printing paper P is completed, the printing paper P is ejected from the printer 1 to the outside by the paper ejection driving roller 15 or the like.

When the carriage 3 is moved, an A-phase signal SG1 and a B-phase signal SG2 are output from the linear encoder 33. The output A-phase signal SG1 and B-phase signal SG2 are input to a predetermined processing circuit (for example, ASIC or the like) of the control unit 37. The predetermined processing circuit of the control unit 37 detects the position, the speed, and the moving direction of the carriage 3 (that is, the rotational position, the rotational direction, and the rotational speed of the CR motor 4) by using the A-phase signal SG1 and the B-phase signal SG2 that are output from the linear encoder 33 and then input to the processing circuit. The printer 1 is controlled on the basis of the detection results. For example, the rotational speed of the CR motor 4 is controlled.

(Operation of Printer When Smear of Linear Scale is Detected)

Figure 10:
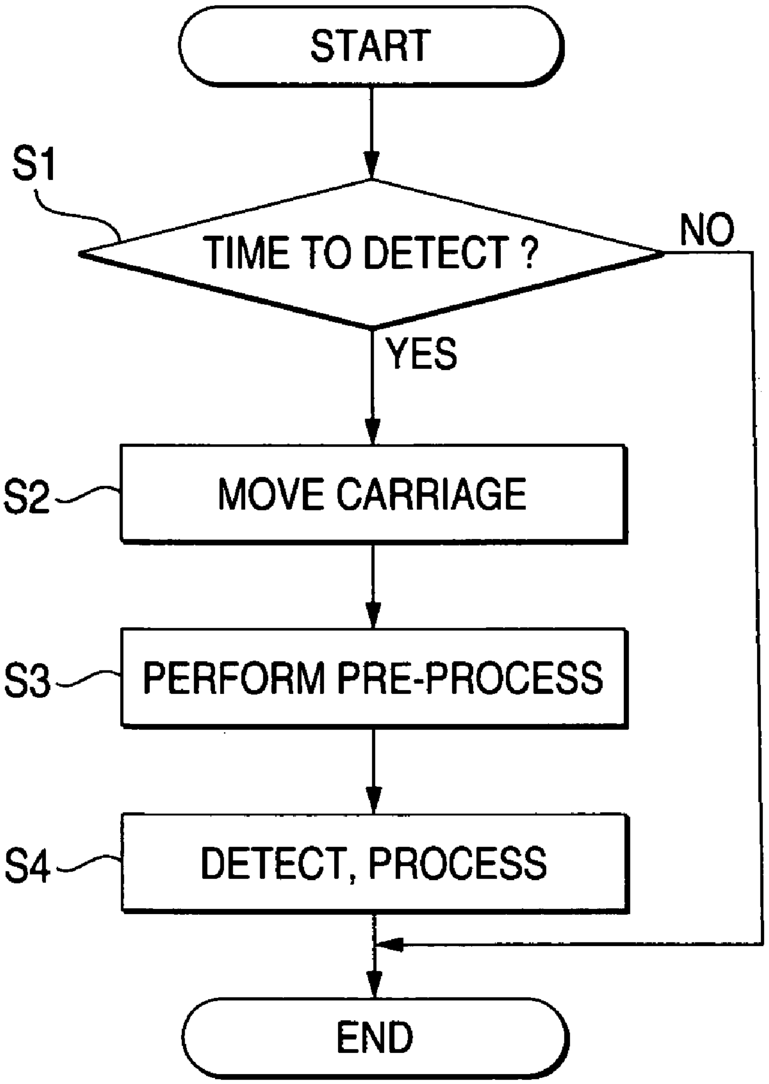
FIG. 10 is a flow chart illustrating the successive operation of the printer when the smear of the linear scale of FIG. 3 is detected.
Figure 11:
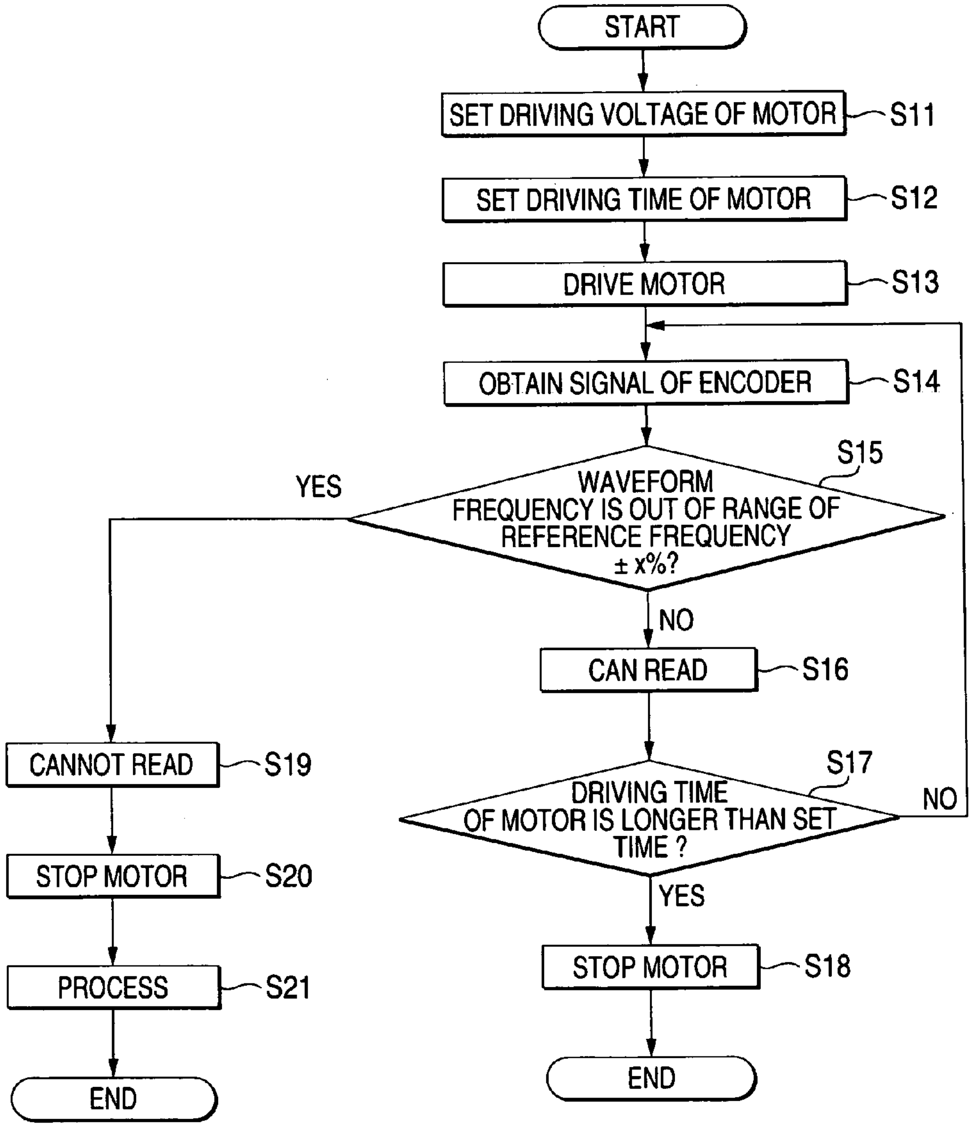
FIG. 11 is a flow chart illustrating an embodiment of the operation for detecting the smear of the linear scale of FIG. 3.
Figure 12:
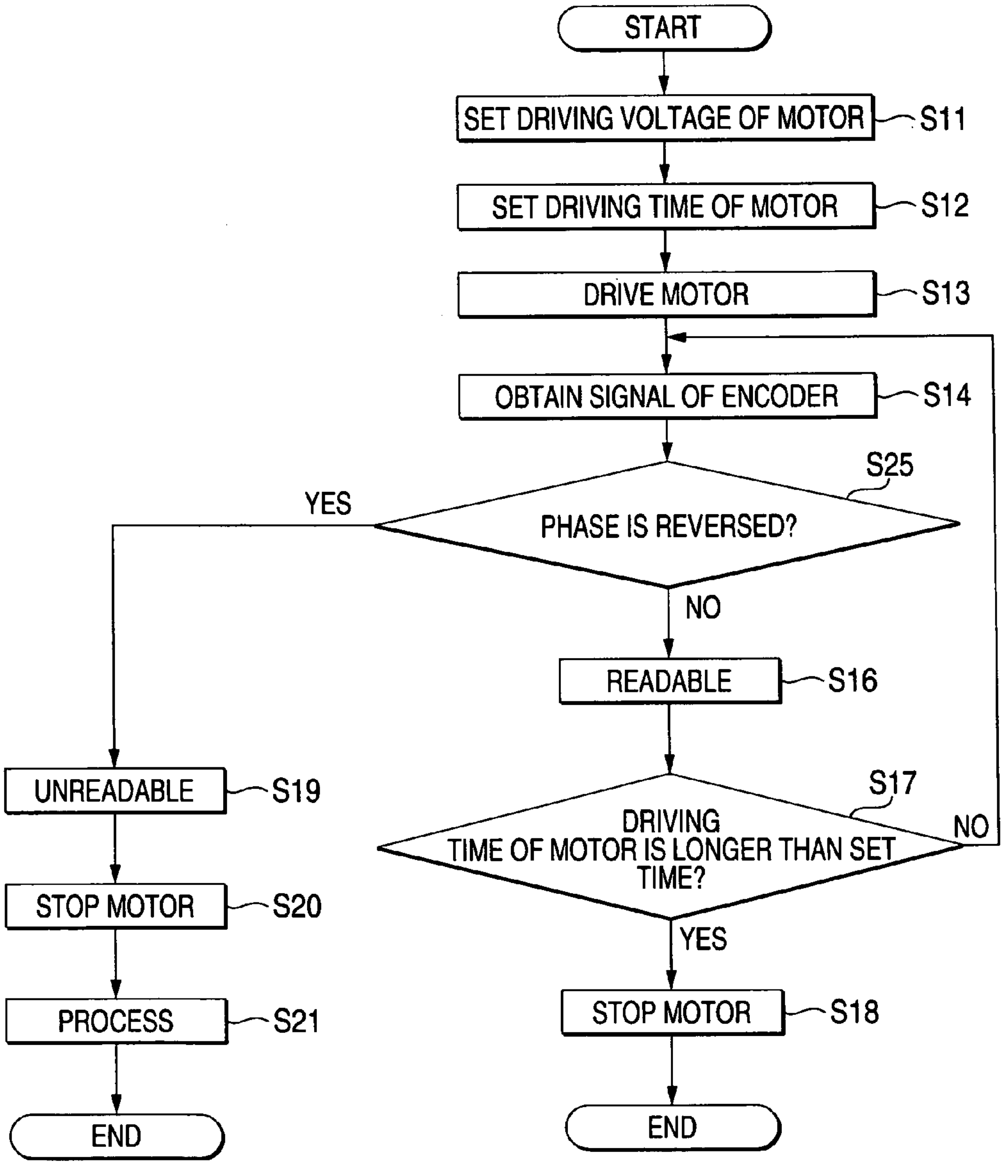
FIG. 12 is a flow chart illustrating another embodiment of the operation for detecting the smear of the linear scale of FIG. 3.
Figure 13A:
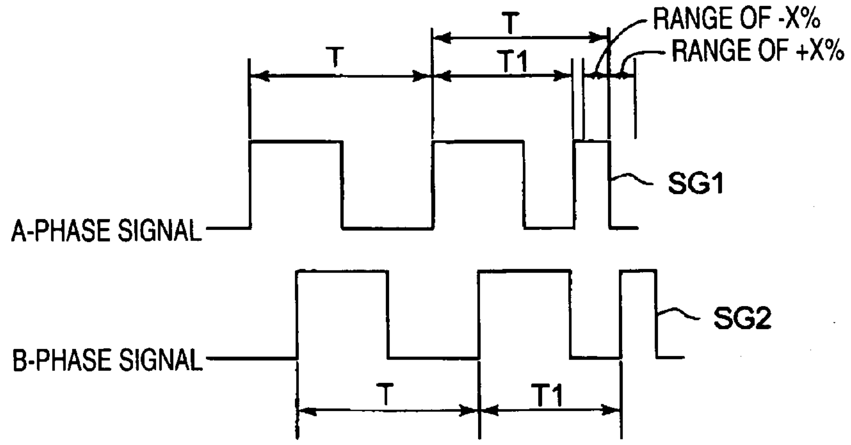
FIGS. 13A and 13B are views showing exemplary waveforms of signals output from the linear encoder when the linear scale of FIG. 3 is contaminated.
Figure 13B:
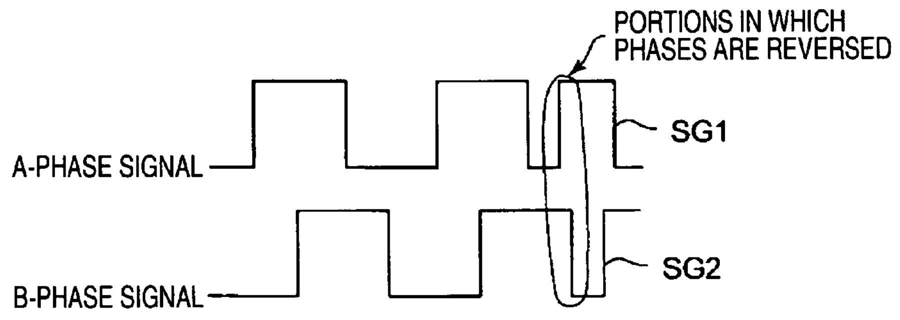
Figure 14:
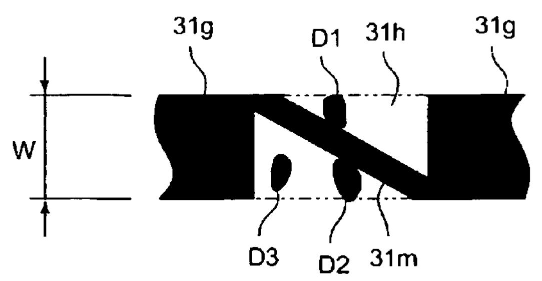
FIG. 14 is an enlarged view of a portion E of FIG. 8A.

FIG. 10 is a flow chart illustrating the successive operation of the printer 1 when the smear of the linear scale 31 of FIG. 3 is detected. FIG. 11 is a flow chart illustrating an embodiment of the operation for detecting the smear of the linear scale 31 of FIG. 3. FIG. 12 is a flow chart illustrating another embodiment of the operation for detecting the smear of the linear scale 31 of FIG. 3. FIGS. 13A and 13B are views showing exemplary waveforms of signals output from the linear encoder 33 when the linear scale 31 of FIG. 3 is contaminated. FIG. 14 is an enlarged view of a portion E of FIG. 8A.

When the printing head 2 discharges ink drops to print the printing paper P, some ink drops are changed into mist, thereby generating ink mist floating in the air. The ink mist floats in the printer 1. The ink mist is attached to the linear scale 31 or the light emitting surface 41*a* or the light receiving surface 42*a* of the photosensor 32, and then contaminates them. When the linear scale 31, the light emitting surface 41*a*, and the light receiving surface 42*a* are contaminated with ink mist, it is not possible to properly detect the position or the speed of the carriage 3. For this reason, the smear of the linear scale 31 is detected in the printer 1. Hereinafter, the successive operation of the printer 1 when the smear of the linear scale 31 is detected will be described.

As shown in FIG. 10, first, the control unit 37 determines whether the time to detect the smear of the linear scale 31 is or not (step S1). The time to detect the smear of the linear scale 31 is the time when a sheet of printing paper P has been completely printed or power is applied to the printer 1. When the time to detect the smear of the linear scale 31 is the time when a sheet of printing paper P has been completely printed, it is possible to increase the number of detections and to detect the smear of the linear scale 31 at a proper time. Further, when the time to detect the smear of the linear scale 31 is the time when power is applied to the printer 1, it is possible to detect the smear of the linear scale 31 through the initial operation of the printer 1 at the time of the start of processes, and it is not necessary to separately detect the smear of the linear scale 31. Accordingly, it is possible to reduce the time loss required for the detection of the smear of the linear scale 31.

Further, for example, the time to detect the smear of the linear scale 31 may be the time when a predetermined period t1 has passed after power is applied to the printer 1, or may be the time when a predetermined period t2 has passed thereafter. In this case, the predetermined period t1 and t2 are equal to each other or different from each other. In addition, the time to detect the smear of the linear scale 31 may be the time when n1 sheets of printing paper P have been completely printed after power is applied to the printer 1, or may be the time when n2 sheets of printing paper P have been completely printed thereafter. In this case, the n1 and n2 are equal to each other or different from each other. Furthermore, the time to detect the smear of the linear scale 31 may be set to an earlier one of the time when the predetermined period t1 has passed after power is applied to the printer 1 and the time when n1 sheets of printing paper P have been completely printed after power is applied to the printer 1, or an earlier one of the time when the predetermined period t2 has passed thereafter and the time when n2 sheets of printing paper P have been completely printed thereafter, by using the elapsed time and the number of sheets of printed paper. When the time to detect the smear is set using the number of sheets of printed paper, the number of sheets of printed paper may be changed into the number of sheets of printed paper when frameless printing is performed onto the A4 paper, so as to set the n1 and n2.

In Step S1, if it is determined that now is not the detection time, the smear of the linear scale 31 is not detected and the printer 1 is, for example, in the standby state. Then, the next printing paper P is printed. Meanwhile, in Step S1, if it is determined that now is the detection time, the carriage 3 moves to the home position or a predetermined position (Step S2).

After that, a predetermined pre-process is performed (Step S3). In Step S3, for example, the variable resistor 52 is adjusted so as to increase or decrease the amount of the light emitted from the light emitting element 50. As described below, if portions for blocking the light emitted from the light emitting part 41 are formed on a part of the second light transmitting parts 31*h* in the longitudinal direction of the linear scale 31 in a predetermined range of a width W, due to the ink mist attached to the second light transmitting parts 31*h* (that is, due to the smear of the second light transmitting parts 31*h*), or if the light emitted from the light emitting part 41 is blocked in the second light transmitting parts 31*h* in a predetermined range of a width W, the smear of the linear scale 31 is detected. Accordingly, if the amount of the light emitted from the light emitting element 50 is large and the degree of the smear of the second light transmitting parts 31*h* is high, even though ink mist is attached to the second light transmitting parts 31*h,* the smear of the linear scale 31 is not detected. Further, if the amount of the light emitted from the light emitting element 50 is small, even though the degree of the smear of the second light transmitting parts 31*h* is low, the smear of the linear scale 31 is detected. Accordingly, it is possible to detect the degree of the smear of the second light transmitting parts 31*h,* by increasing or decreasing the amount of the light emitted from the light emitting element 50. The pre-process in Step S3 is not necessarily performed, and the Step S3 may be omitted.

When the pre-process in Step S3 is completed, it actually conducts the detection of the smear of the linear scale 31 and necessary processes (Step S4). In Step S4, as shown in FIG. 11, first, a driving voltage of the CR motor 4 is set (Step S11). More specifically, the driving voltage is set constant so that the carriage 3 moves at a substantially constant speed after having been accelerated. Further, a driving time of the CR motor 4 is set (Step S12). More specifically, the driving time of the CR motor 4 is set so that the photosensor 32 fixed to the carriage 3 positioned at the home position or a predetermined position passes through the portions having the smear detecting pattern 31*c* in the linear scale 31.

After that, the CR motor 4 is driven with the driving voltage and the driving time set as described above (Step S13). The carriage 3 moves due to the drive of the CR motor 4, and the photosensor 32 fixed to the carriage 3 moves with respect to the linear scale 31. Due to the relative movement, the linear encoder 33 outputs an A-phase signal SG1 and a B-phase signal SG2 having a cycle T. The A-phase signal SG1 and the B-phase signal SG2, which are the signals output from the linear encoder 33, are input to the control unit 37. That is, the control unit 37 obtains the output signals of the linear encoder 33 (Step S14).

After that, the control unit 37 determines whether the linear scale 31 is contaminated (Step S15). When ink mist is attached to the linear scale 31, for example, ink mist attached portions D1, D2, and D3 are formed on the second light transmitting parts 31*h* as shown in FIG. 14. Further, portions for blocking the light emitted from the light emitting part 41 are formed on a part of the second light transmitting parts 31*h* in the longitudinal direction of the linear scale 31 in a predetermined range of a width W, due to the ink mist attached portions D1 and D2 and the light blocking portions 31*m*.

Alternatively, the light emitted from the light emitting part 41 is blocked due to the attachment of ink mist in the second light transmitting parts 31*h*. When the portions for blocking the light emitted from the light emitting part 41 are formed on a part of the linear scale 31 in the longitudinal direction thereof in a predetermined range of a width W, or when the light emitted from the light emitting part 41 is blocked in a predetermined range of a width W in the second light transmitting parts 31*h*, variation occurs in the cycle of the A-phase signal SG1 and the B-phase signal SG2 that are output from the linear encoder 33. In the present embodiment, when predetermined variation occurs in the cycle of the A-phase signal SG1 and B-phase signal SG2 that are output from the linear encoder 33, it is determined whether the portions for blocking the light emitted from the light emitting part 41 are formed on a part of the linear scale 31 in the longitudinal direction thereof in a predetermined range of a width W, or whether the light emitted from the light emitting part 41 is blocked in the second light transmitting parts 31*h*. In this case, it is determined whether the linear scale 31 is contaminated.

More specifically, in Step S15, it is determined whether the cycle (or frequency) of the A-phase signal SG1 and the B-phase signal SG2 when the photosensor 32 passes through the portions having the smear detecting pattern 31*c* is out of the range of a reference cycle T (or frequency) ±x % (for example, ±15%). When the cycle of the A-phase signal SG1 and the B-phase signal SG2 is in the range of the reference cycle T (or frequency) ±x %, it is possible to correctly detect (that is, to correctly read) the position of the carriage by the linear encoder 33 even in the portions having the smear detecting pattern 31*c* (Step S16). That is, in the case, portions for blocking the light emitted from the light emitting part 41 are not formed on a part of the second light transmitting parts 31*h* in the longitudinal direction of the linear scale 31 in a predetermined range of a width W, and the light emitted from the light emitting part 41 is blocked in the second light transmitting parts 31*h* in a predetermined range of a width W. As a result, it is determined that the linear scale 31 is not contaminated. In addition, since the linear scale 31 is not contaminated, it is determined that the linear encoder 33 can properly detect the position of the carriage.

When it is determined that the linear scale 31 is not contaminated, it is determined whether the driving time of the CR motor 4 is over the set time (Step S17). When the driving time of the CR motor 4 is less than the set time, the procedure returns to Step S14 and the control unit 37 obtains the output signals of the linear encoder 33. When the driving time of the CR motor 4 is less over the set time, the CR motor 4 is stopped (Step S17). For example, while the carriage 3 is positioned at the home position, the CR motor 4 is stopped and the detection of the smear of the linear scale 31 in Step S4 is completed.

Meanwhile, as shown in FIG. 13A, for example, when the cycle T1 of the A-phase signal SG1 and the B-phase signal SG2 is out of the range of the reference cycle T ±x %, the portions for blocking the light emitted from the light emitting part 41 are formed on a part of the second light transmitting parts 31*h* in the longitudinal direction of the linear scale 31 in a predetermined range of a width W due to the ink mist attached portions D1 and D2 and the light blocking portions 31*m*, as shown in FIG. 14. For this reason, in the portions having the smear detecting pattern 31*c*, it is possible to correctly detect (that is, to correctly read) the position of the carriage by the linear encoder 33 (Step S19). That is, in this case, it is determined that the linear scale 31 is contaminated. Since the linear scale 31 is contaminated, it is determined that it is likely to incorrectly detect the position of the carriage in the linear encoder 33. When it is determined that the linear scale 31 is contaminated, the CR motor 4 is stopped (Step 20).

As shown in FIG. 14, as shown in FIG. 14, when the portions for blocking the light emitted from the light emitting part 41 are formed in the second light transmitting parts 31*h* on a part of the linear scale 31 in the longitudinal direction thereof in a predetermined range of a width W due to the ink mist attached portions D1 and D2 and the light blocking portions 31*m*, the cycle T1 of the A-phase signal SG1 and the B-phase signal becomes shorter than the cycle T. In contrast, when the light is blocked in the second light transmitting parts 31*h* in a predetermined range of a width W due to the ink mist, the cycle of the A-phase signal SG1 and the B-phase signal becomes longer than the cycle T.

When the CR motor 4 is stopped in Step 20, the printer 1 performs predetermined processes (Step S21). When the linear scale 31 is contaminated, it is presumed that the light emitting surface 41*a* and the light receiving surface 42*a* are also contaminated. For this reason, in Step S21, the light emitting surface 41*a* and the light receiving surface 42*a* (specifically, lenses (not shown) fixed to the light emitting surface 41*a* and the light receiving surface 42*a*) are cleaned. More specifically, first, the carriage 3 moves by the CR motor 4 to a predetermined position on the eighty-column side. After that, the CR motor 4 is driven by a predetermined voltage so that the carriage 3 reciprocates the predetermined number of times between the predetermined position and a position in which the cleaning members 83 and 83 come in contact with the light emitting surface 41*a* and the light receiving surface 42*a* so as to clean the light emitting surface 41*a* and the light receiving surface 42*a*. That is, the cleaning members 83 and 83 clean the light emitting surface 41*a* and the light receiving surface 42*a* due to the reciprocation of the carriage 3. As described above, in the present embodiment, the carriage 3 serves as a cleaning member moving device that moves the cleaning members 83 and 83 with respect to the light emitting surface 41*a* of the light emitting part 41 and the light receiving surface 42*a* of the light receiving part 42.

In Step S21, the linear scale 31 may be further cleaned. Due to the cleaning of the linear scale 31, it is possible to reliably prevent the incorrect detection of the linear encoder 33.

In addition, the following processes are performed in Step S21.

For example, in Step S21, it is confirmed that the linear scale is contaminated after how much printing paper P is printed. Alternatively, when the time to detect the smear of the linear scale 31 is a predetermined time, it is confirmed that the linear scale is contaminated after how long printing paper P is printed. More specifically, the control unit 37 calculates the number of sheets of paper to be printed and printing time to be required until the linear scale is contaminated. It is possible to find out the number of sheets of paper to be printed and printing time to be required until the linear scale is contaminated, through the above-mentioned confirmation.

In Step S21, for example, a warning message for notifying a user that the linear scale 31 is contaminated, an error message caused by the smear of the linear scale 31, or a message for notifying a user that the linear scale needs to be cleaned are displayed on a display (not shown), such as a liquid crystal display, mounted to the main chassis 8 of the printer 1. Since the messages are displayed on the display, it is possible to notify a user that the linear scale 31 is contaminated, and to prevent the operation failure of the printer 1 that is caused by the incorrect detection of the linear scale 31.

Further, in Step S21, for example, the printer 1 is stopped, and thus the printer 1 is unavailable. Since the printer 1 is unavailable, it is possible to prevent the operation failure of the printer 1 that is caused by the incorrect detection of the linear encoder 33 and to prevent the user from being hurt due to the runaway of the carriage 3. Then, in Step S21, the control unit 37 may be set so that the printer 1 is stopped after printing is further performed for a predetermined period or after the predetermined numbers of sheets of paper are further printed.

Furthermore, in Step S21, for example, the control unit 37 sets the upper speed limit of the carriage 3. Even though the amount of the light, which is transmitted through the first light transmitting parts 31*f* and then received by the light receiving part 42, is reduced due to the smear of the linear scale 31, if the speed of the carriage 3 is low to some extent, it is possible to avoid the incorrect detection of the linear encoder 33. For this reason, when the upper speed limit of the carriage 3 is set, even though the linear scale 31 is contaminated, it is possible to prevent the incorrect detection of the linear encoder 33. As a result, in the printer 1, printing can be performed on the predetermined numbers of sheets of printing paper or for a predetermined period. In addition, the upper speed limit of the printing paper P to be fed by the PF driving roller 6 may be set in Step S21.

Further, in Step S21, for example, the variable resistor 52 is adjusted so as to increase or decrease the amount of the light emitted from the light emitting element 50. When the amount of the light emitted from the light emitting element 50 is increased, if the degree of the smear of the linear scale is not so high even though the linear scale 31 is contaminated, printing can be performed in the printer 1 on the predetermined numbers of sheets of printing paper or for a predetermined period. In this case, since the amount of the light emitted from the light emitting element 50 is adjusted by the variable resistor 52, it is possible to easily increase the amount of the light emitted from the light emitting element 50. In addition, the amount of the light emitted from the light emitting element 50 may be increased stepwise by the variable resistor 52 at a rate of increment in which printing can be performed on the predetermined numbers of sheets of printing paper or for a predetermined period. In this case, it is possible to reduce the power consumption of the light emitting part 41.

In Step S21, for example, the scale lifting mechanism 44 lifts down the linear scale 31. That is, portions having a predetermined width W in the linear scale 31 (see FIG. 8A) relatively move upward. Light emitted from the light emitting part 41 is radiated on to the portions having a predetermined width W in the linear scale 31. Since the linear scale 31 is mounted to the supporting frame 16 so that the lateral direction of the linear scale 31 is defined as a height direction, ink mist caused by the ink ejected from the printing head 2 is attached to the lower portion of the linear scale 31. Accordingly, the lower portion of the linear scale 31 is likely to be contaminated. For this reason, when the scale lifting mechanism 44 lifts down the linear scale 31, it is possible to detect the position of the carriage 3 by using the upper portion of the linear scale 31 that is hardly contaminated. As a result, printing can be further performed in the printer 1 on the predetermined numbers of sheets of printing paper or for a predetermined period.

When the above-mentioned processes in Step S21 are completed, the detection and process of the smear of the linear scale 31 in Step S4 are completed.

According to the above-mentioned embodiment, in Step S15, it is determined whether the cycle (frequency) of the A-phase signal SG1 and the B-phase signal SG2 when the photosensor 32 passes through the portions having the smear detecting pattern 31*c* is out of the range of a reference cycle T (frequency) ±x % (for example, ±15%). As a result, it is determined whether the linear scale 31 is contaminated. In addition, for example, as illustrated in the flow chart of FIG. 12, it may be determined whether the linear scale 31 is contaminated, by determining whether the relative phase between the A-phase signal SG1 and the B-phase signal SG2 when the photosensor 32 passes through the portions having the smear detecting pattern 31*c* is reversed (Step S25).

More specifically, as described below, it may be determined whether the linear scale 31 is contaminated. That is, for example, as shown in FIG. 13A, in case that the carriage 3 moves the zero-column side to the eighty-column side, when the B-phase signal SG2 is in high level, the A-phase signal SG1 raised when the B-phase signal SG2 is in low level rises (that is, the relative phase between the A-phase signal SG1 and the B-phase signal SG2 is reversed). In this case, as shown in FIG. 14, the portions for blocking the light emitted from the light emitting part 41 are formed on a part of the linear scale 31 in the longitudinal direction thereof in a predetermined range of a width W due to the ink mist attached portions D1 and D2 and the light blocking portions 31*m*. For this reason, in the portions having the smear detecting pattern 31*c*, it is possible to correctly detect (that is, to correctly read) the position of the carriage by the linear encoder 33 (Step S19). That is, in this case, it is determined that the linear scale 31 is contaminated. Since the linear scale 31 is contaminated, it is determined that it is likely to incorrectly detect the position of the carriage in the linear encoder 33.

In addition, Step S15 and Step S25 may be combined with each other to determine whether the linear scale 31 is contaminated. That is, it may be determined whether the linear scale 31 is contaminated, by determining whether the cycle (frequency) of the A-phase signal SG1 and the B-phase signal SG2 when the photosensor 32 passes through the portions having the smear detecting pattern 31*c* is out of the range of a reference cycle T (frequency) ±x %, and by determining whether the relative phase between the A-phase signal SG1 and the B-phase signal SG2 when the photosensor 32 passes through the portions having the smear detecting pattern 31*c* is reversed.

Main Effect of the Present Embodiment

As described above, the linear encoder 33 of the present embodiment includes the cleaning members 83 and 83 that come in contact with the light emitting surface 41*a* and the light receiving surface 42*a* so as to clean the light emitting surface 41*a* and the light receiving surface 42*a*. Accordingly, it is possible to remove the smear from the light emitting surface 41*a* and the light receiving surface 42*a*, and to suppress the incorrect detection in the linear encoder 33. In addition, in the present embodiment, the cleaning members 83 and 83 are fixed to the linear scale 31. For this reason, when the position of the carriage 3 is detected, it is possible to fix the cleaning members 83 and 83 to the linear scale 31 at positions where the cleaning members 83 and 83 do not normally come in contact with the light emitting surface 41 a or the light receiving surface 42*a*. As a result, it is possible to prevent the accuracy from deteriorating in detecting the position of the carriage 3.

In the present embodiment, the linear scale 31 includes the smear detecting pattern 31*c* in addition to the position detecting pattern 31*b* used to detect the position of the carriage 3. Accordingly, when the control unit 37 has detected the smear of the linear scale 31 on the basis of the light receiving results of the light receiving part 42 when the photosensor 32 passes through smear detecting pattern 31*c*, the cleaning members 83 and 83 clean the light emitting surface 41*a* and the light receiving surface 42*a*. That is, when the smear of the linear scale 31 is detected from the detection results in the light receiving part 42 about the light that is emitted from the light emitting part 41 and then transmitted through the second light transmitting parts 31*f*, it is presumed that the light emitting surface 41*a* and the light receiving surface 42*a* are contaminated. Therefore, the light emitting surface 41*a* and the light receiving surface 42*a* are cleaned by the cleaning members. For this reason, only when the light emitting surface 41*a* and the light receiving surface 42*a* need to be cleaned, the light emitting surface 41*a* and the light receiving surface 42*a* can be cleaned by the cleaning members. As a result, it is possible to omit an unnecessary cleaning operation.

In particular, in the present embodiment, the cleaning members 83 and 83 are fixed to the linear scale 31 in a region which is different from a region on which the position detecting pattern 31*b* is formed. Accordingly, it is possible to clean the light emitting surface 41 a and the light receiving surface 42*a*, without effects on the detection of the position of the carriage 3. That is, it is possible to clean the light emitting surface 41*a* and the light receiving surface 42*a* by the cleaning members 83 and 83, without the deterioration of the accuracy in detecting the position of the carriage 3.

In particular, in the present embodiment, the cleaning members 83 and 83 are fixed to the linear scale 31 in a region which is different from regions on which the position detecting pattern 31*b* and the smear detecting pattern 31*c* are formed. Accordingly, it is possible to clean the light emitting surface 41*a* and the light receiving surface 42*a*, without effects on the detection of the position of the carriage 3 or the detection of the smear of the linear scale 31. That is, it is possible to clean the light emitting surface 41*a* and the light receiving surface 42*a* by the cleaning members 83 and 83, without the deterioration of the accuracy in detecting the position of the carriage 3 or in detecting the smear of the linear scale 31.

In the present embodiment, the cleaning members 83 and 83 are disposed on the linear scale 31 outside the smear detecting pattern 31*c* in the longitudinal direction of the linear scale 31. Accordingly, the carriage 3 moving from the zero-column side to the eighty-column side is simply configured so as to further relatively move in the longitudinal direction of the linear scale 31 when the printing paper P is printed. That is, the light emitting part 41 and the light receiving part 42 moving in the longitudinal direction of the linear scale 31 are simply configured so as to further relatively move in the longitudinal direction of the linear scale 31 when the position of the carriage 3 is detected. As a result, it is possible to clean the light emitting part 41 and the light receiving part 42.

In the present embodiment, the smear detecting pattern 31*c* is disposed on the linear scale 31 outside the position detecting pattern 31*b* in the longitudinal direction of the linear scale 31, and the cleaning members 83 and 83 are disposed on the linear scale 31 outside the smear detecting pattern 31*c* in the longitudinal direction of the linear scale 31. Accordingly, it is possible to detect the smear of the linear scale 31, without effects on the detection of the position of the carriage 3. In addition, the carriage 3 moving from the zero-column side to the eighty-column side is simply configured so as to further relatively move in the longitudinal direction of the linear scale 31 when the printing paper P is printed. That is, the light emitting part 41 and the light receiving part 42 moving in the longitudinal direction of the linear scale 31 are simply configured so as to further relatively move in the longitudinal direction of the linear scale 31 when the position of the carriage 3 is detected. As a result, it is possible to detect the smear of the linear scale 31 and to clean the light emitting part 41 and the light receiving part 42.

In the present embodiment, the light blocking patterns 31*k* are formed in the second light transmitting parts 31*h*. The light blocking patterns 31*k* reduce the light transmission area of the second light transmitting parts 31*h* through which the light emitted from the light emitting part 41 is transmitted so that the light transmission area of the second light transmitting parts is smaller than that of the first light transmitting parts 31*f*. That is, the light blocking patterns 31*k* reduce the light transmissivity of the second light transmitting parts 31*h* through which the light emitted from the light emitting part 41 is transmitted so that the light transmissivity of the second light transmitting parts is smaller than that of the first light transmitting parts 31*f*. Therefore, when ink mist as smears is attached to the linear scale 31, the portions for blocking the light are more easily formed on a part of the second light transmitting parts 31*h* in the longitudinal direction of the linear scale 31 in a predetermined range of a width W as compared to the first light transmitting parts 31*f*. For example, as shown in FIG. 14, the portions for blocking the light emitted from the light emitting part 41 are easily formed on a part of the linear scale 31 in the longitudinal direction thereof in a predetermined range of a width W due to the ink mist attached portions D1 and D2 and the light blocking portions 31*m*. Accordingly, the light is blocked on a part or all of the first light transmitting parts 31*f* used to detect the position of the carriage 3 in the longitudinal direction of the linear scale 31 in a predetermined range of a width W. As a result, it is possible to detect the smear of the linear scale 31 using the A-phase signal SG1 and the B-phase signal SG2 output from the linear encoder 33 when the photosensor 32 passes through the portions having the smear detecting pattern 31*c*, before the position of the carriage is incorrectly detected in the linear encoder 33.

Another Embodiment

Although the above-mentioned embodiment is a preferred embodiment of the invention, the invention is not limited thereto and may have various modifications and changes without departing from the scope and spirit of the invention.

In the above-mentioned embodiment, when the carriage 3 (specifically, photosensor 32) moves in the longitudinal direction of the linear scale 31, the cleaning members 83 and 83 come in contact with the light emitting surface 41 a and the light receiving surface 42*a* so as to clean the light emitting surface 41*a* and the light receiving surface 42*a*. In addition, for example, the cleaning members 83 and 83, the light emitting surface 41*a*, and the light receiving surface 42*a* are positioned in the longitudinal direction of the linear scale 31. Then, while the linear scale 31 moves up and down by the scale lifting mechanism 44, the light emitting surface 41 a and the light receiving surface 42*a* may be cleaned by the scale lifting mechanism 44. In this case, the scale lifting mechanism 44 serves as a cleaning member moving device that moves the cleaning members 83 and 83 with respect to the light emitting part 41 and the light receiving part 42.

Further, although the cleaning members 83 and 83 are fixed to the linear scale 31 on the eighty-column side in the above-mentioned embodiment, the cleaning members 83 and 83 may be fixed to the linear scale 31 on the zero-column side outside the position detecting pattern 31*b* in the main scanning direction MS.

Figure 15:
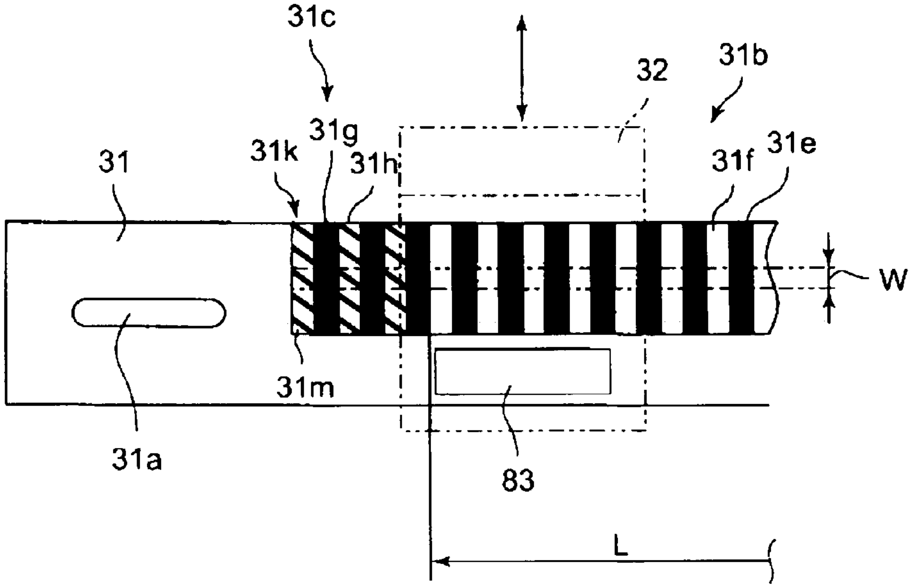
FIG. 15 is a view showing the eighty-column side of a linear scale according to another embodiment of the invention.

Further, although the cleaning members 83 and 83 are fixed to the linear scale 31 outside the position detecting pattern 31*b* in the longitudinal direction of the linear scale. In addition, for example, as shown in FIG. 15, the cleaning members 83 and 83 may be fixed to both surfaces of the linear scale 31 so as to be adjacent to the position detecting pattern 31*b* in the lateral direction of the linear scale 31. In this case, it is possible to reduce the size of the linear encoder 33 in the longitudinal direction of the linear scale 31. Further, even in this case, since the cleaning members 83 and 83 are fixed to the linear scale 31 in regions on which the position detecting pattern 31*b* and the smear detecting pattern 31*c* are not formed, it is possible to clean the light emitting surface 41*a* and the light receiving surface 42*a*, without effects on the detection of the position of the carriage 3 or the smear of the linear scale 31. That is, it is possible to clean the light emitting surface 41*a* and the light receiving surface 42*a* by the cleaning members 83 and 83, without the deterioration of the accuracy in detecting the position of the carriage 3 or in detecting the smear of the linear scale 31. Furthermore, the cleaning members 83 and 83 may be fixed to the linear scale 31 so as to be adjacent to the smear detecting pattern 31*c* in the lateral direction of the linear scale 31.

When the cleaning members 83 and 83 are fixed to the linear scale 31 so as to be adjacent to the position detecting pattern 31*b* in the lateral direction of the linear scale 31, as shown in FIG. 15, the cleaning members 83 and 83 may be fixed to the lower side of the position detecting pattern 31*b* or the upper side of the position detecting pattern 31*b*. In addition, the cleaning members 83 and 83 may be fixed to the upper and lower sides of the position detecting pattern 31*b*.

As shown in FIG. 15, in case that the cleaning members 83 and 83 are fixed to both surfaces of the linear scale 31 so as to be adjacent to the position detecting pattern 31*b* in the lateral direction of the linear scale 31, when the printing paper P is printed, the light emitting part 41 and the light receiving part 42 face to each other with the position detecting pattern 31*b* interposed therebetween. When the light emitting surface 41 a and the light receiving surface 42*a* are cleaned, the linear scale 31 is moved up and down by the scale lifting mechanism 44. Accordingly, the cleaning members 83 and 83 come in contact with the light emitting surface 41*a* and the light receiving surface 42*a* so as to clean the light emitting surface 41*a* and the light receiving surface 42*a*. After the linear scale 31 is lifted up (or lifted down) by the scale lifting mechanism 44, the CR motor 4 is driven to move the carriage 3 in the longitudinal direction of the linear scale 31. As a result, it is possible to clean the light emitting surface 41*a* and the light receiving surface 42*a* by the cleaning members 83 and 83.

Figure 16A:
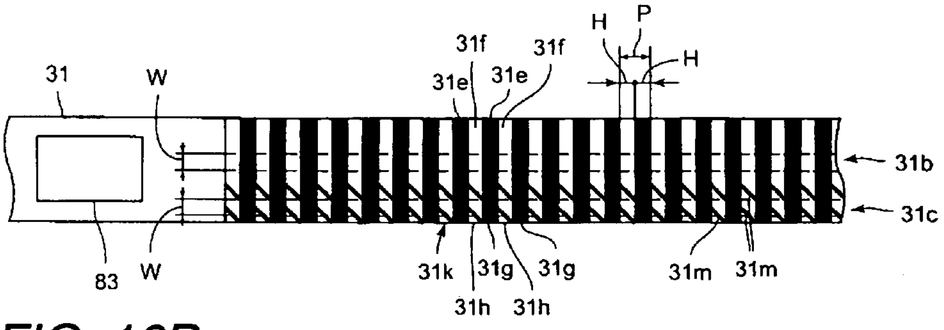
FIGS. 16A to 16D are views showing the eighty-column side of a linear scale according to another embodiment of the invention.
Figure 16B:
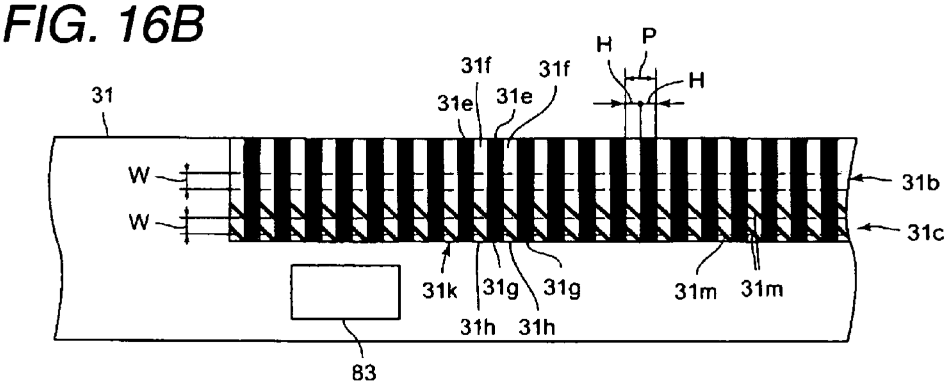

Furthermore, in the above-mentioned embodiment, the smear detecting pattern 31*c* is disposed on the linear scale 31 outside the position detecting pattern 31*b* in the longitudinal direction of the linear scale 31. In addition, for example, as shown FIGS. 16A and 16B, the smear detecting pattern 31*c* may be disposed on the linear scale so as to be adjacent to the position detecting pattern 31*b* in the lateral direction of the linear scale 31. In this case, as shown in FIGS. 16A, the cleaning members 83 and 83 may be disposed on the linear scale outside (for example, on the eighty-column side) the position detecting pattern 31*b* and the smear detecting pattern 31*c* in the longitudinal direction of the linear scale 31. As shown in FIG. 16B, the cleaning members 83 and 83 may be disposed on the linear scale so as to be adjacent to the smear detecting pattern 31*c* in the lateral direction of the linear scale 31.

When the cleaning members 83 and 83 are disposed as shown in FIG. 16A, it is possible to detect the smear of the linear scale 31, without effects on the detection of the position of the carriage 3 which is performed by moving the carriage 3 in the longitudinal direction of the linear scale 31. When the position of the carriage 3 is detected, the carriage 3 moving in the longitudinal direction of the linear scale 31 is simply configured so as to further relatively move in the longitudinal direction of the linear scale 31 when the position of the carriage 3 is detected. As a result, it is possible to clean the light emitting part 41 and the light receiving part 42. Further, when the cleaning members 83 and 83 are disposed as shown in FIG. 16B, it is possible to reduce the size of the linear encoder 33 in the longitudinal direction of the linear scale 31. In addition, the cleaning members 83 and 83 may be disposed so as to be adjacent to the position detecting pattern 31*b* (that is, on the upper side of the position detecting pattern 31*b* in FIG. 16B).

Figure 16C:
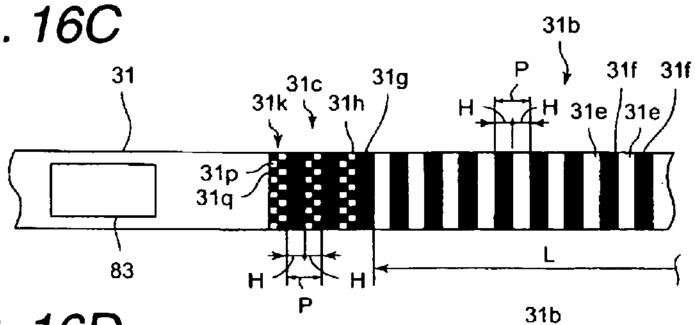
Figure 16D:
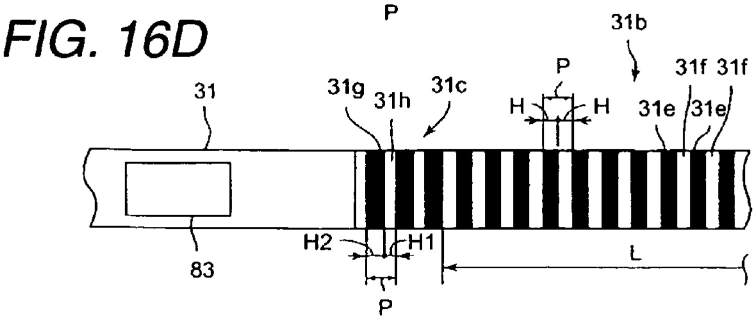

In the above-mentioned embodiment, the light blocking patterns 31*k* formed by the light blocking portions 31*m* having an oblique line shape are formed on the second light transmitting parts 31*h*. In addition, for example, as shown in FIG. 16C, the light blocking patterns 31*k* may be formed by rectangular light transmitting parts 31 p and rectangular light blocking parts 31q disposed checkerwise. Further, as shown in FIG. 16D, the width H1 of the second light transmitting part 31*h* may be smaller than the width H of the first light transmitting part 31*f*. In this case, the light blocking patterns 31*k* may be formed on the second light transmitting parts 31*h*. When the width H1 of the second light transmitting part 31*h* is smaller than the width H of the first light transmitting part 31*f*, for example, the second light blocking part 31*g* is formed to have a width H2. As shown in FIG. 16D, the sum of the width H1 of the second light transmitting part 31*h* and the width H2 of the second light blocking part 31*g* is equal to the pitch P of light and darkness that is formed by the first light transmitting parts 31*f* and the first light blocking parts 31*e*.

Furthermore, in the above-mentioned embodiment, the linear encoder 33 has been exemplarily described to describe the embodiment of the invention. However, the invention can also be applied to a rotary encoder 36. Hereinafter, an embodiment in which the invention is applied to a rotary encoder 36 will be described.

Figure 17A:
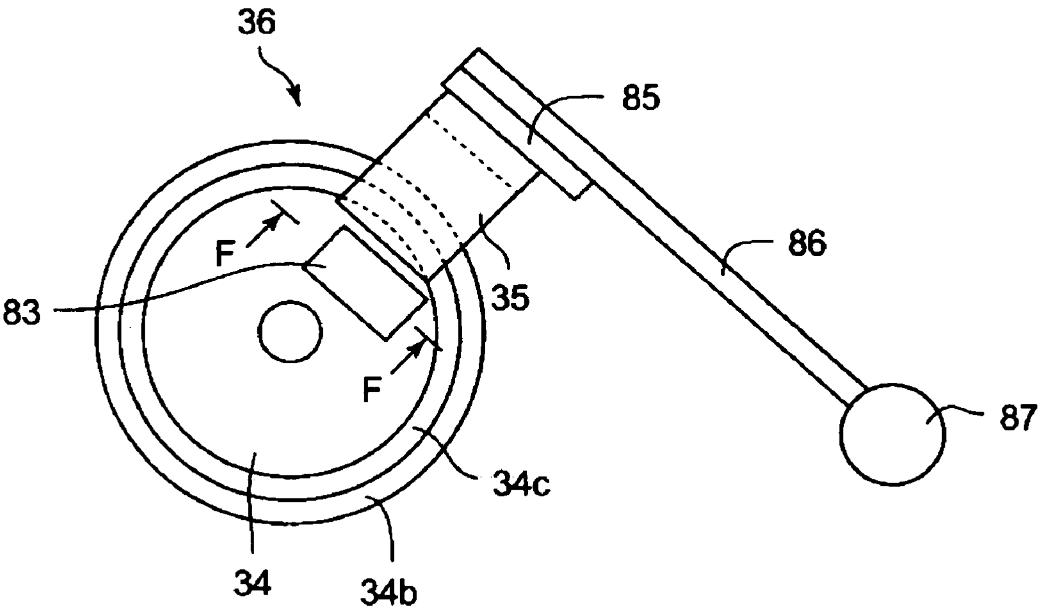
FIGS. 17A and 17B are views showing a rotary encoder according to another embodiment of the invention.
Figure 17B:
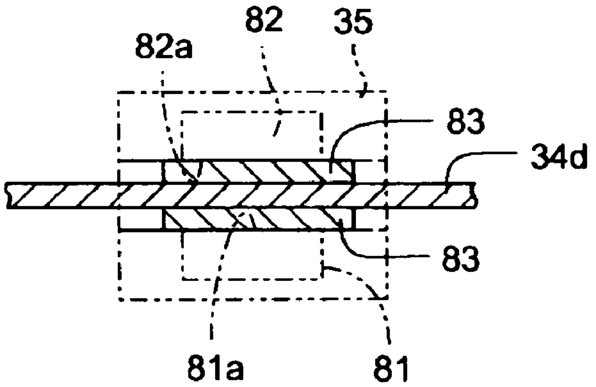

For example, as shown in FIG. 17A, a photosensor 35 is fixed to a bracket 86, which is fixed to a rotary member 87 to be rotated, with a control substrate 85 interposed therebetween. Further, a position detecting pattern 34*b* is formed on the outer circumferential end of a rotary scale 34, and a smear detecting pattern 34*c* is formed inside the position detecting pattern 34*b* in a radial direction of the rotary scale. Cleaning members 83 and 83 are fixed to both surfaces of the rotary scale 34 on the inner side of the smear detecting pattern 34*c* in the radial direction. FIG. 17B is a cross-sectional view taken along line F-F of FIG. 17A. The position detecting pattern 34*b* has the same configuration as the position detecting pattern 31*b* of the linear scale 31, and the smear detecting pattern 34*c* has the same configuration as the smear detecting pattern 31*c* of the linear scale 31.

In a rotary encoder 36 shown in FIGS. 17A and 17B, when the position of a PF driving roller 6 is detected, a light emitting part 81 and a light receiving part 82 face to each other with the position detecting pattern 34*b* of the rotary scale 34. The PF driving roller 6 is an object to be detected when the printing paper P is printed. When the smear of the rotary scale 34 is detected, the bracket 86 and the photosensor 35 are rotated about the center of the rotary member 87 so that the light emitting part 81 and the light receiving part 82 face to each other with the smear detecting pattern 34*c*. Further, when a light emitting surface 81*a* of a light emitting element 81 and a light receiving surface 82*a* of a light receiving element 82 are cleaned, the bracket 86 and the photosensor 35 are rotated about the center of the rotary member 87. As s result, the cleaning members 83 and 83 come in contact with the light emitting surface 81*a* and the light receiving surface 82*a* so as to clean the light emitting surface 81*a* and the light receiving surface 42*a*. In addition, after the photosensor 35 is rotated until the cleaning members 83 and 83 come in contact with the light emitting surface 81 a and the light receiving surface 82*a*, the light emitting surface 81*a* and the light receiving surface 82*a* may be cleaned by the driving the PF motor 5 to rotate the rotary scale 34. In this case, a driving means for rotating the rotary member 87 serves as a cleaning member moving device that moves the cleaning members 83 and 83 with respect to the light emitting surface 81*a* of the light emitting element 81 and the light receiving surface 82*a* of the light receiving element 82.

As described above, even in the rotary encoder 36 shown in FIGS. 17A and 17B, when the position of the PF riving roller 6 is detected, it is possible to fix the cleaning members 83 and 83 to the rotary scale 34 at positions where the cleaning members 83 and 83 do not normally come in contact with the light emitting surface 81*a* or the light receiving surface 82*a*. As a result, it is possible to prevent the accuracy from deteriorating in detecting the position of the PF driving roller 6. Further, since the cleaning members 83 and 83 are fixed to the rotary scale 34 in regions on which the position detecting pattern 34*b* and the smear detecting pattern 34*c* are not formed, it is possible to clean the light emitting surface 81 a and the light receiving surface 82*a*, without effects on the detection of the position of the PF driving roller 6 or the smear of the rotary scale 34. In addition, the smear detecting pattern 34*c* is disposed inside the position detecting pattern 34*b* in the radial direction of the rotary scale 34, and the cleaning members 83 and 83 are disposed inside the smear detecting pattern 34*c* in the radial direction of the rotary scale 34. Accordingly, it is possible to reduce the size of the rotary encoder 36 in the radial direction of the rotary scale 34.

Furthermore, in the above-mentioned embodiment and the rotary encoder 36 shown in FIGS. 17A and 17B, the cleaning members 83 and 83 are fixed to both surface of the linear scale 31 and the rotary scale 34. In addition, for example, one cleaning member 83 may be fixed to only one surface of the linear scale 31 and the rotary scale 34 so as to clean only one of the light emitting surface 41*a* or 81*a* and the light emitting surface 42*a* or 82*a*.

In the above-mentioned embodiment, an A-phase signal SG1 that is a digital signal is generated from a differential between an output signal from the first amplifier 58 and an output signal from the third amplifier 60, and a B-phase signal SG2 that is a digital signal is generated from a differential between an output signal from the second amplifier 59 and an output signal from the fourth amplifier 61. In addition, for example, as shown in FIG. 18A, when a predetermined threshold value C may be set in the output signal from amplifiers such as the first amplifier 58 so as to generate the A-phase signal SG1 or the like that is a digital signal. That is, the digital signal may be generated so that a high-level signal is output when the value of the output signal is larger than the threshold value C and a low-level signal is output when the value of the output signal is smaller than the threshold value C. In this case, the smear of the linear scale 31 may be detected as described below.

The amount of the light, which is emitted from the light emitting part 41 and then transmitted through the first light transmitting parts 31*f*, is larger than the amount of the light, which is emitted from the light emitting part 41 and then transmitted through the second light transmitting parts 31*h*. For this reason, in case that ink mist is not attached to the linear scale 31, for example, when the photosensor 32 passes through the portions having the position detecting pattern 31*b*, a signal SG11 is output from the amplifier as shown in FIG. 18A. Further, when the photosensor 32 passes through the portions having the smear detecting pattern 31*c*, a signal SG12 having a lower level than the signal SG11 is output from the amplifier. A digital signal SG13 shown in FIG. 18B is generated from the signal SG11 and the threshold value C, and a digital signal SG14 shown in FIG. 18C is generated from the signal SG12 and the threshold value C. In this case, as the amount of the light that is emitted from the light emitting part 41 and then transmitted through the linear scale 31 is increased, the cycle of a high-level portion of a digital signal becomes long. As a result, a cycle T11 of a high-level portion of the digital signal SG13 becomes longer than a cycle T12 of a high-level portion of the digital signal SG14. When the linear scale 31 is not contaminated, a ratio of the cycle T12 to the cycle T11 is, for example, 80%.

When ink mist is uniformly attached to the linear scale 31, the level of the signal SG1 1 is lowered at the same level as the signal SG12. For example, as shown in FIG. 18D, the level is lowered from the level of the signal SG11 to the level of the signal SG12, and the level of the signal SG12 is lowered to the level of the signal SG22. Further, as shown in FIG. 18E, a cycle T21 of a high-level portion of a digital signal SG23 that is generated from a signal SG21 and the threshold value C becomes shorter than the cycle T11. Furthermore, as shown in FIG. 18F, a cycle T22 of a high-level portion of a digital signal SG24 becomes shorter than the cycle T12.

Figure 18:
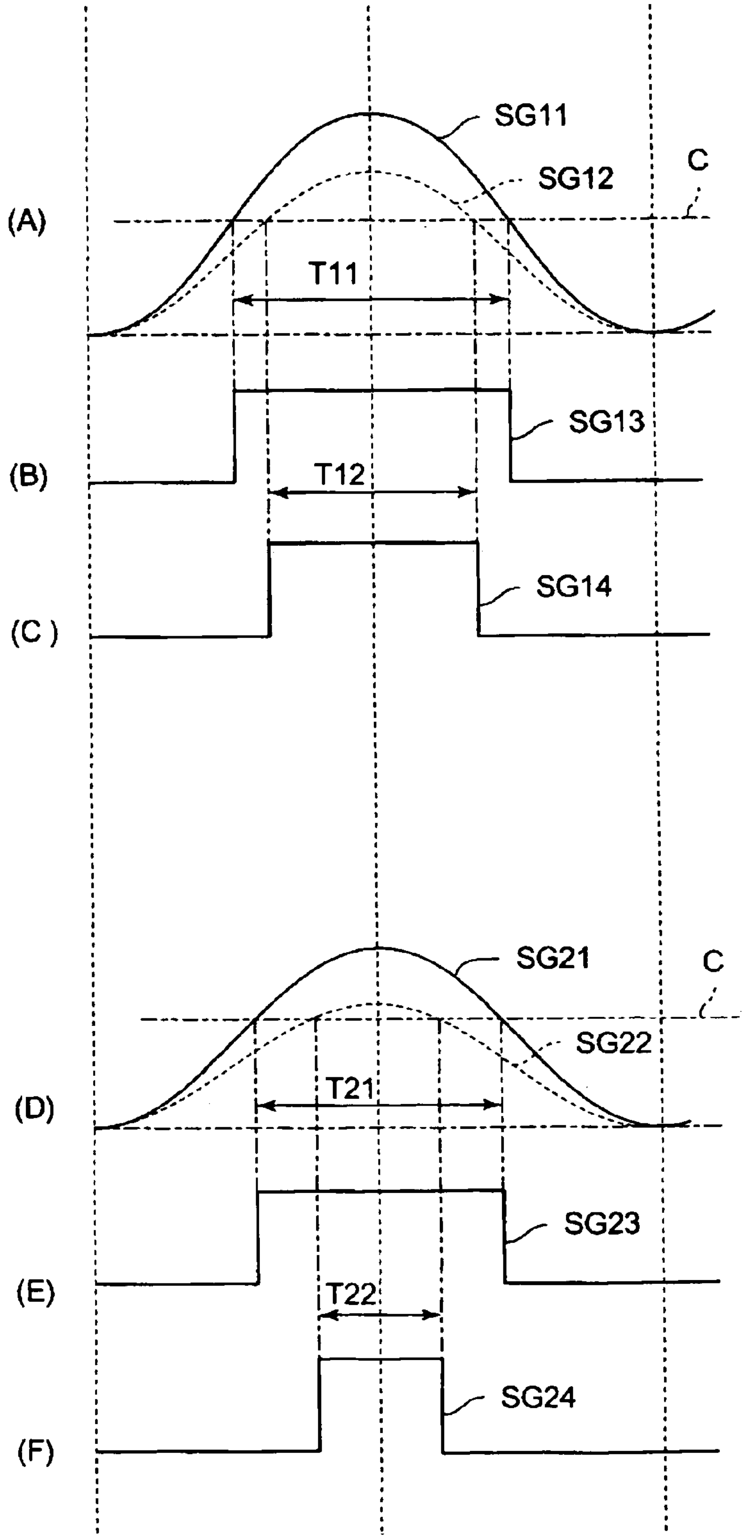
FIG. 18 is a view illustrating a method of detecting the smear of the linear scale according to another embodiment of the invention.

In this case, as shown in FIG. 18, a ratio of the cycle T22 to the cycle T21 becomes lower than the ratio of the cycle T12 to the cycle T11. For example, the ratio of the cycle T12 to the cycle T11 is 80%, and the ratio of the cycle T22 to the cycle T21 is 50%. Accordingly, in case that ink mist is attached to the linear scale 31, when a ratio between the cycle (for example, cycle T21) of the high-level portion of the digital signal based on the position detecting pattern 31*b* and the cycle (for example, cycle T22) of the high-level portion of the digital signal based on the smear detecting pattern 31*c* is lower than a predetermined value, it can be determined that the linear scale 31 is contaminated. As described above, when digital signals are generated by setting a predetermined threshold value C in the output signals from amplifiers, it is possible to detect the smear of the linear scale 31 by using the above-mentioned method. Further, it is possible to detect the smear of the linear scale 31, from a decreasing rate of the cycle of the high-level portion of the digital signal based on the smear detecting pattern 31*c* with respect to an initial state.

Figure 19:
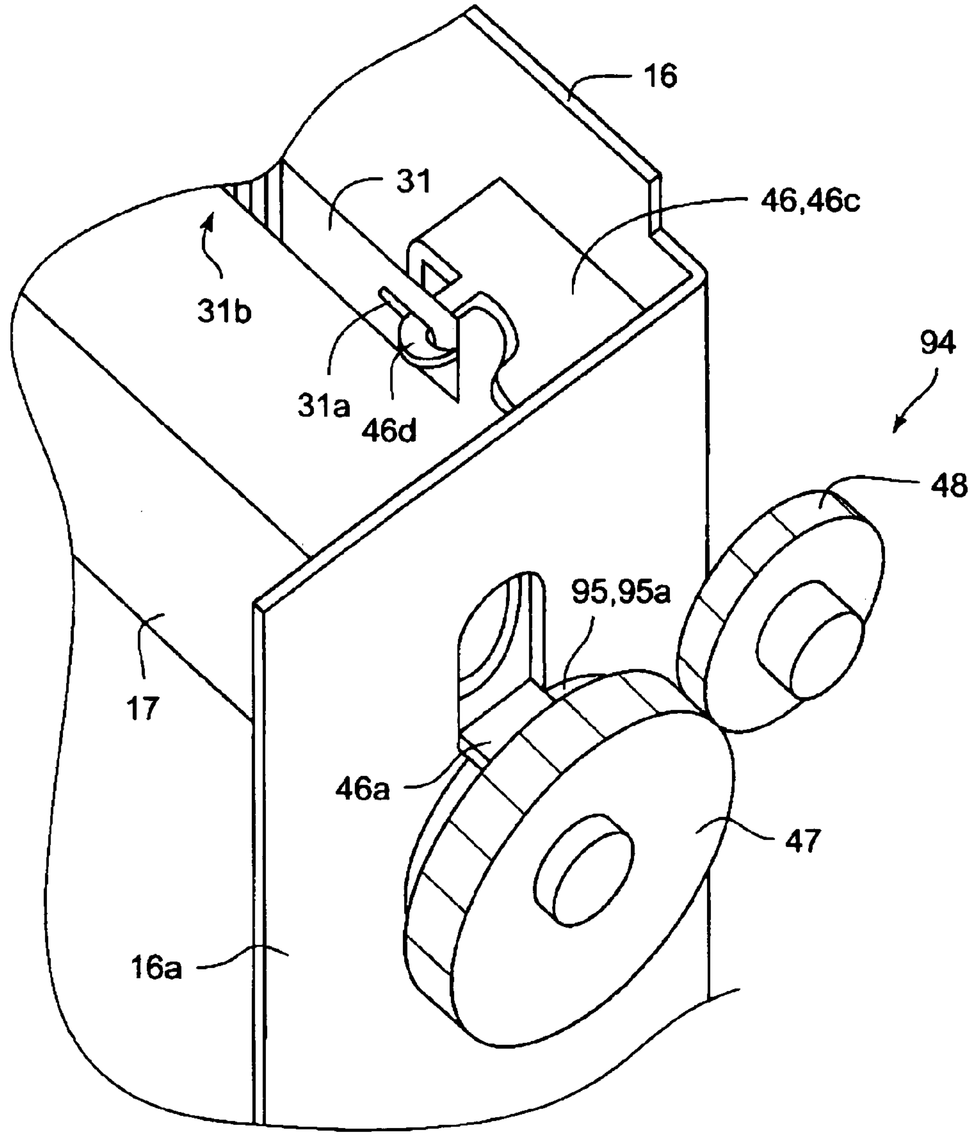
FIG. 19 is a perspective view schematically showing a state in which one end of the linear scale according to another embodiment of the invention is mounted.

In the above-mentioned embodiment, the scale lifting mechanism 44 includes an eccentric cam 45 and a driven gear 47, and an intermediate gear 48. The eccentric cam 45 is fixed to the guide shaft 17 inside one part 16*a* of the supporting frame 16. The driven gear 47 is fixed to the front end of the guide shaft 17 outside one part 16*a*. In addition, for example, like a scale lifting mechanism 94 shown in FIG. 19, an eccentric cam 95 corresponding to the eccentric cam 45 is formed integrally with a driven gear 47, and the eccentric cam 95 and the driven gear 47 formed integrally with each other may be rotatably mounted to the front end of a guide shaft 17 outside one part 16*a*. In this case, as shown in FIG. 19, a mounting bracket 46 is provided with a contact part 46*a* protruding from a base part 46*b* toward the outside of the printer 1, and the contact part 46*a* comes in contact with a cam surface 95*a* of the eccentric cam 95. The cam surface 95*a* has the same structure as the cam surface 45*a*. In this case, the guide shaft 17 does not rotate. In FIG. 19, like reference numerals are given to the same elements as those in FIG. 5.

In addition, as shown in FIG. 15, in the configuration in which the cleaning members 83 and 83 are fixed to the linear scale 31 so as to be adjacent to the position detecting pattern 31*b* in the longitudinal direction of the linear scale 31, if the printer 1 includes a gap adjusting mechanism for adjusting a gap between a nozzle surface (lower surface in FIG. 2) of the printing head 2 and a platen 7, the light emitting surface 41*a* and the light receiving surface 42*a* may be cleaned by the gap adjusting mechanism. That is, a carriage 3 and a photosensor 32 fixed to the carriage 3 may move up and down by the gap adjusting mechanism so that the cleaning members 83 and 83 clean the light emitting surface 41*a* and the light receiving surface 42*a*. In this case, the gap adjusting mechanism serves as a cleaning member moving device that moves the cleaning members 83 and 83 with respect to the light emitting part 41 and the light receiving part 42.

Furthermore, in the above-mentioned embodiment, the pre-process in Step S3 when the smear of the linear scale 31 is detected may be a process for moving parallel the linear scale 31 toward the light emitting part 41 or the light receiving part 42 in the sub-scanning direction SS. As described above, the light emitting part 41 is provided with the collimator lens 51. However, the light emitted from the light emitting part 41 is not completely collimated. For this reason, when the linear scale 31 is close to the light receiving part 42, a proper detection is easily performed by the light receiving part 42. Accordingly, when the linear scale 31 moves toward the light emitting part 41, even though the degree of the smear of the second light transmitting parts 31*h* is low, variation easily occurs in the cycle of the A-phase signal SG1 and the B-phase signal SG2 that are output from the linear encoder 33. That is, it is easy to detect the smear of the linear scale 31. Meanwhile, when the linear scale 31 moves toward the light receiving part 42, if the degree of the smear of the second light transmitting parts 31*h* is not large, variation hardly occurs in the cycle of the A-phase signal SG1 and the B-phase signal SG2 that are output from the linear encoder 33. That is, it is difficult to detect the smear of the linear scale 31. As described above, in Step S31, when the linear scale 31 moves toward the toward the light emitting part 41 or the light receiving part 42, it is possible to detect the degree of the smear of the linear scale 31.

Furthermore, in the above-mentioned, when the linear scale 31 is contaminated, it is presumed that the light emitting surface 41*a* and the light receiving surface 42*a* are also contaminated. For this reason, the light emitting surface 41*a* and the light receiving surface 42*a* are cleaned. In addition, for example, the light emitting surface 41*a* and the light receiving surface 42*a* may be cleaned irrespective of the detection of the smear of the linear scale 31, after when predetermined sheets of printing paper P has been completely printed or printing has been performed for a predetermined time. Further, after printing is performed in a predetermined printing mode (for example, a entire printing mode in which the entire surface of the paper printing paper P is printed, or a photograph printing mode in which a photograph is printed), the light emitting surface 41*a* and the light receiving surface 42*a* may be cleaned.

In the above-mentioned embodiment, the scale lifting mechanism 44 includes an eccentric cam 45 and a driven gear 47, and an intermediate gear 48. The eccentric cam 45 is fixed to the guide shaft 17 inside one part 16*a* of the supporting frame 16. The driven gear 47 is fixed to the front end of the guide shaft 17 outside one part 16*a*. In addition, for example, like a scale lifting mechanism 94 shown in FIG. 19, an eccentric cam 95 corresponding to the eccentric cam 45 is formed integrally with a driven gear 47, and the eccentric cam 95 and the driven gear 47 formed integrally with each other may be rotatably mounted to the front end of a guide shaft 17 outside one part 16*a*. In this case, as shown in FIG. 19, a mounting bracket 46 is provided with a contact part 46*a* protruding from a base part 46*b* toward the outside of the printer 1, and the contact part 46*a* comes in contact with a cam surface 95*a* of the eccentric cam 95. The cam surface 95*a* has the same structure as the cam surface 45*a*. In this case, the guide shaft 17 does not rotate. In FIG. 19, like reference numerals are given to the same elements as those in FIG. 5.

In addition, as shown in FIG. 15, in the configuration in which the cleaning members 83 and 83 are fixed to the linear scale 31 so as to be adjacent to the position detecting pattern 31*b* in the longitudinal direction of the linear scale 31, if the printer 1 includes gap adjusting mechanisms 70 (see FIG. 20) for adjusting a gap between a nozzle surface (lower surface in FIG. 2) of the printing head 2 and a platen 7, the light emitting surface 41 a and the light receiving surface 42*a* may be cleaned by the gap adjusting mechanisms 70. That is, a carriage 3 and a photosensor 32 fixed to the carriage 3 may move up and down by the gap adjusting mechanisms 70 so that the cleaning members 83 and 83 clean the light emitting surface 41*a* and the light receiving surface 42*a*. Hereinafter, the schematic configuration of the gap adjusting mechanisms 70 will be described.

The gap adjusting mechanisms 70 are configured so as to lift the guide shaft 17 with respect to the supporting frame 16 by cam mechanisms. The gap adjusting mechanisms 70 are provided on both one part 16*a* and the other part 16*b*. Hereinafter, a gap adjusting mechanism 70 provided on one part 16*a* will be described as an example of the gap adjusting mechanisms 70. As shown in FIGS. 10 to 22, the gap adjusting mechanism 70 includes an eccentric cam 71, a first driven gear 72, a gear train 74, a stationary pin 75, a detection plate 76, a photosensor 77, and a second driven gear 78. The eccentric cam 71 is fixed to the end of the guide shaft 17 on the zero-column side thereof, and the first driven gear 72 is fixed to the end of the guide shaft 17 on the zero-column side thereof. The gear train 74 transmits the power from a driving motor 73 to the first driven gear 72. The stationary pin 75 is fixed to one part 16*a* and comes in contact with the cam surface 71 of the eccentric surface 71*a*. The detection plate 76 and the photosensor 77 detect the rotational position of the eccentric cam 71. The second driven gear 78 is connected to the gear train 74 so as to rotate the detection plate 76.

Figure 20:
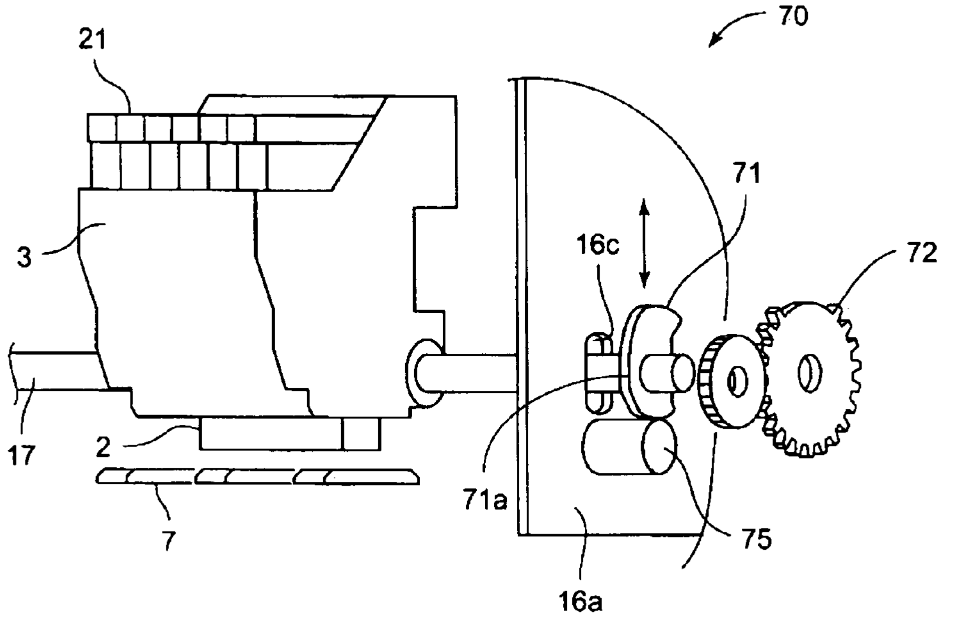
FIG. 20 is a view showing a part of a gap adjusting mechanism according to the embodiment.
Figure 21:
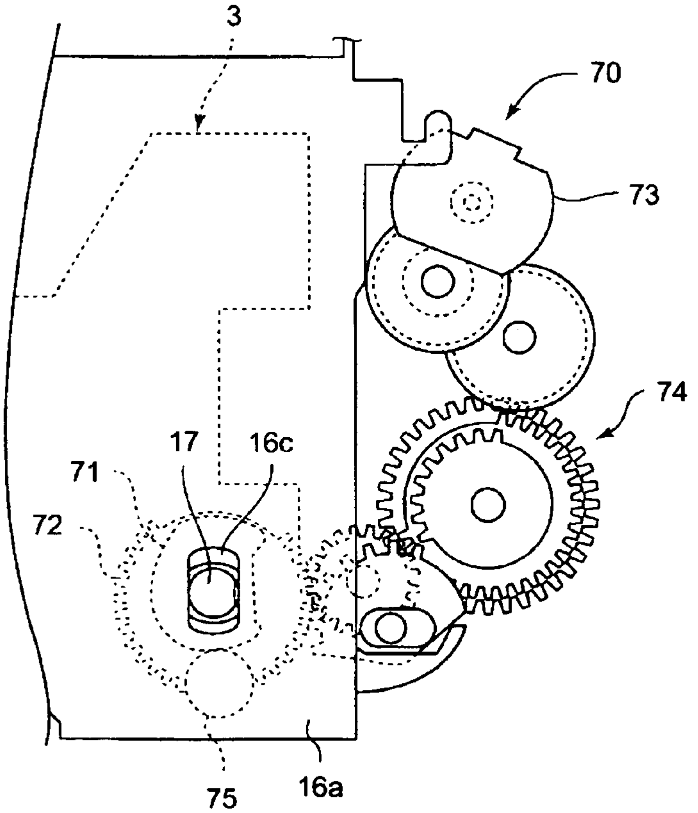
FIG. 21 is a side elevational view showing a part of the gap adjusting mechanism of FIG. 20.

As shown in FIG. 20, one part 16*a* of the supporting frame 16 includes a through hole 16*c* having an elongated slot shape in an up-and-down direction. The guide shaft 17 is inserted into the through hole 16*c*. In addition, the eccentric cam 71 and the first driven gear 72 are fixed to the end of the guide shaft 17 protruding from one part 16*a*, in this order from the inside. The stationary pin 75 is fixed to one part 16*a* below the through hole 16*c*, and the cam surface 71*a* of the eccentric cam 71 comes in contact with the stationary pin 75 so as to apply a predetermined contact force to the stationary pin 75. Further, the cam surface 71*a* of the eccentric cam 71 is formed to have a radius that changes stepwise with respect to the center of rotation. For example, the radius of the cam surface 71*a* changes to have five steps in a circumferential direction with respect to the center of rotation of the eccentric cam 71 so as to adjust stepwise a gap between the nozzle surface of the printing head 2 and the platen 7.

Figure 22:
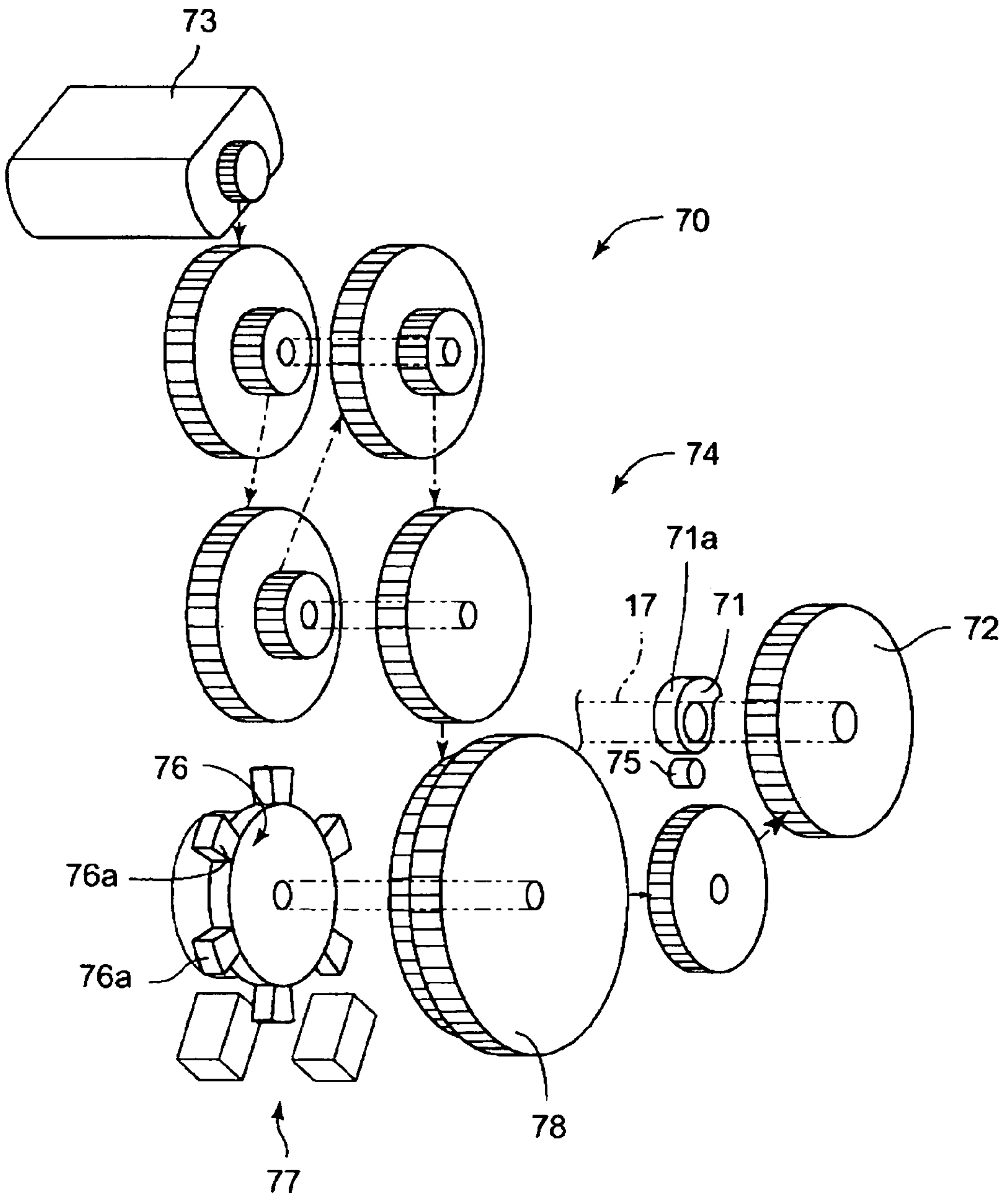
FIG. 22 is a exploded perspective view showing a part of the gap adjusting mechanism of FIG. 20.

As shown in FIG. 22, the detection plate 20 is formed in a disk shape, and includes a plurality of detection parts 76*a* protruding from the circumference of the detection plate in a radial direction. The detection parts 76*a* are configured to be detected by the photosensor 77. In addition, the detection plate 76 is fixed to the second driven gear 78 through a predetermined shaft or the like, and is integrally rotated with the second driven gear 78.

In the gap adjusting mechanism 70 configured as described above, when the driving motor 73 is rotated, the power is transmitted from the driving motor 73 to the first driven gear 72 through the gear train 74. As a result, the first driven gear 72, the guide shaft 17, and the eccentric cam 71 are rotated. When the eccentric cam 71 is rotated, the distance between the guide shaft 17 serving as the center of rotation of the eccentric cam 71 and the stationary pin 75 coming in contact with the cam surface 71 a of the eccentric cam 71 is changed. As a result, the guide shaft 17 is lifted with respect to the supporting frame 16. That is, the carriage 3 is lifted. Meanwhile, the power is also transmitted from the driving motor 73 to the second driven gear 78 through the gear train 74. As a result, the detection plate 76 is integrally rotated with the second driven gear 78. Then, the rotational position of the eccentric cam 71 is detected.

Further, in the above-mentioned embodiment, the pre-process in Step S3 when the smear of the linear scale 31 is detected may be a process for moving parallel the linear scale 31 toward the light emitting part 41 or the light receiving part 42 in the sub-scanning direction SS. As described above, the light emitting part 41 is provided with the collimator lens 51. However, the light emitted from the light emitting part 41 is not completely collimated. For this reason, when the linear scale 31 is close to the light receiving part 42, a proper detection is easily performed by the light receiving part 42. Accordingly, when the linear scale 31 moves toward the light emitting part 41, even though the degree of the smear of the second light transmitting parts 31*h* is low, variation easily occurs in the cycle of the A-phase signal SG1 and the B-phase signal SG2 that are output from the linear encoder 33. That is, it is easy to detect the smear of the linear scale 31. Meanwhile, when the linear scale 31 moves toward the light receiving part 42, if the degree of the smear of the second light transmitting parts 31*h* is not large, variation hardly occurs in the cycle of the A-phase signal SG1 and the B-phase signal SG2 that are output from the linear encoder 33. That is, it is difficult to detect the smear of the linear scale 31. As described above, in Step S31, when the linear scale 31 moves toward the light emitting part 41 or the light receiving part 42, it is possible to detect the degree of the smear of the linear scale 31.

In the above-mentioned embodiments, the printer 1 has been described as a liquid ejecting apparatus to describe the constitution of the invention. However, the constitution of the invention can be also applied to various liquid ejecting apparatuses using an inkjet technology, such as an apparatus for manufacturing color filters, a dyeing apparatus, a micro-machining apparatus, an apparatus for manufacturing semiconductors, a surface machining apparatus, a three-dimensional modeling device, an apparatus for manufacturing organic light emitting diodes (in particular, an apparatus for manufacturing polymer organic light emitting diodes), an apparatus for manufacturing displays, a deposition system, or an apparatus for DNA chips. Liquid to be ejected by the liquid ejecting apparatuses may includes working liquid, DNA liquid, and liquid including a metal material, an organic material (in particular, a polymer material), a magnetic material, a conductive material, a wiring material, a deposition material, electronic ink, and the like.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-290803 filed on Oct. 4, 2005 and Japan Patent Application No. 2005-359991 filed on Dec. 14, 2005, the contents of which are incorporated herein for reference.

What is claimed is:

1. A position detecting device for detecting a position of an object, comprising:

a light emitting portion that includes a light emitting surface which emits light;

a light receiving portion that includes a light receiving surface which receives the light from the light emitting portion;

a scale that is arranged between the light emitting surface and the light receiving surface; and a cleaning member that is fixed to the scale to clean at least one of the light emitting surface and the light receiving surface.

2. The position detecting device according to claim 1, wherein the scale includes a position detecting pattern for detecting the position of the object; and wherein the cleaning member is fixed to the scale in a region which is different from a region on which the position detecting pattern is formed.

3. The position detecting device according to claim 2, wherein the scale is a linear scale having a long plate shape; and wherein the cleaning member is arranged at an outer side of the position detecting pattern in a longitudinal direction of the linear scale.

4. The position detecting device according to claim 2, wherein the scale is a linear scale having a long plate shape; and wherein the cleaning member is arranged so as to be contiguous to the position detecting pattern in a width direction of the linear scale.

5. The position detecting device according to claim 2, wherein the scale is a rotary scale having a circular plate shape; and wherein the cleaning member is arranged at an inner diameter side of the rotary scale with respect to the position detecting pattern.

6. The position detecting device according to claim 2, wherein the scale includes a smear detecting pattern for detecting smear of the scale.

7. The position detecting device according to claim 6, wherein the cleaning member is fixed to the scale in a region which is different from regions on which the position detecting pattern and the smear detecting pattern are formed.

8. The position detecting device according to claim 6, wherein the scale is a linear scale having a long plate shape;

wherein the smear detecting pattern is arranged at an outer side of the position detecting pattern in a longitudinal direction of the linear scale; and wherein the cleaning member is arranged at an outer side of the smear detecting pattern in the longitudinal direction.

9. The position detecting device according to claim 6, wherein the scale is a linear scale having a long plate shape;

wherein the smear detecting pattern is arranged at an outer side of the position detecting pattern in a longitudinal direction of the linear scale; and wherein the cleaning member is arranged so as to be contiguous to at least one of the position detecting pattern and the smear detecting pattern in a width direction of the linear scale.

10. The position detecting device according to claim 6, wherein the scale is a linear scale having a long plate shape;

wherein the smear detecting pattern is arranged so as to be contiguous to the position detecting pattern in a width direction of the linear scale; and wherein the cleaning member is arranged at an outer side of at least one of the position detecting pattern and the smear detecting pattern in the longitudinal direction.

11. The position detecting device according to claim 6, wherein the scale is a linear scale having a long plate shape;

wherein the smear detecting pattern is arranged so as to be contiguous to the position detecting pattern in a width direction of the linear scale; and wherein the cleaning member is arranged so as to be contiguous to at least one of the position detecting pattern and the smear detecting pattern in the width direction.

12. The position detecting device according to claim 6, wherein the scale is a rotary scale having a circular plate shape;

wherein the smear detecting pattern is arranged at an inner diameter side of the rotary scale with respect to the position detecting pattern; and wherein the cleaning member is arranged at an inner diameter side of the rotary scale with respect to the smear detecting pattern.

13. The position detecting device according to claim 6, wherein the position detecting pattern has a first light transmitting portion for transmitting the light from the light emitting portion and a first light blocking portion for blocking the light from the light emitting portion which are alternately arranged in a detection range of the object;

wherein the smear detecting pattern has a second light transmitting portion for transmitting the light from the light emitting portion and a second light blocking portion for blocking the light from the light emitting portion which are alternately arranged; and wherein the second light transmitting portion is formed with a light blocking pattern so that a light transmitting area of the second light transmitting portion into which the light from the light emitting portion transmits is smaller than that of the first light transmitting portion or a light transmittivity in the second light transmitting portion is smaller than a light transmittivity in the first light transmitting portion.

14. The position detecting device according to claim 1, further comprising:

a smear detecting portion that detects the smear of the scale on the basis of a result of the light receiving part in the smear detecting pattern;

a cleaning member moving device that relatively moves the cleaning member with respect to the light emitting part and the light receiving part, wherein the cleaning member moving device relatively moves the cleaning member to a cleaning position to clean the at least one of the light emitting surface and the light receiving surface, when the smear detecting portion detects the smear of the scale.

15. A liquid ejecting apparatus, comprising;

the position detecting device according to claim 1; and a liquid ejection portion that ejects a liquid to a medium.

16. A method of cleaning smear of a scale having a position detecting pattern and a smear detecting pattern of a position detecting device, the method comprising:

detecting the smear of the scale in the smear detecting pattern;

moving a cleaning member to a cleaning position in which the cleaning member comes in contact with at least one of a light emitting surface and a light receiving surface of the position detecting device, when the smear of the scale is detected; and cleaning the at least one of the light emitting surface and the light receiving surface by the cleaning member.

* * * * *